(12) United States Patent
Jiang et al.

(10) Patent No.: US 7,914,875 B2
(45) Date of Patent: Mar. 29, 2011

(54) POLYMER HYBRID MEMBRANE STRUCTURES

(75) Inventors: Dayue D Jiang, Painted Post, NY (US);
Wei Liu, Richland, WA (US)

(73) Assignee: Corning Incorporated, Corning, NY (US)

( * ) Notice: Subject to any disclaimer, the term of this patent is extended or adjusted under 35 U.S.C. 154(b) by 470 days.

(21) Appl. No.: 12/112,661

(22) Filed: Apr. 30, 2008

(65) Prior Publication Data

US 2009/0110873 A1 Apr. 30, 2009

Related U.S. Application Data

(60) Provisional application No. 61/000,817, filed on Oct. 29, 2007.

(51) Int. Cl.
*B32B 3/26* (2006.01)
*B32B 3/12* (2006.01)

(52) U.S. Cl. .................. 428/116; 428/315.9; 428/312.2; 428/474.4; 428/474.7; 428/476.3; 428/477.7

(58) Field of Classification Search ........................ None
See application file for complete search history.

(56) References Cited

U.S. PATENT DOCUMENTS

| 5,611,843 | A | 3/1997 | Ho ..................................... 95/51 |
| 6,099,621 | A | 8/2000 | Ho ..................................... 95/139 |
| 6,315,968 | B1 | 11/2001 | Quinn et al. .................. 423/220 |
| 7,011,694 | B1 | 3/2006 | Ho ..................................... 95/51 |
| 7,132,150 | B2 | 11/2006 | Ogunwumi et al. .......... 428/117 |
| 2004/0047799 | A1 | 3/2004 | Randhava et al. ............. 423/652 |
| 2004/0211319 | A1 | 10/2004 | Kang et al. ........................ 96/11 |
| 2005/0077226 | A1 | 4/2005 | Bishop et al. .............. 210/321.6 |
| 2005/0092683 | A1 | 5/2005 | Goldsmith ..................... 210/640 |
| 2005/0191426 | A1 | 9/2005 | Moya .......................... 427/372.2 |
| 2005/0211624 | A1 | 9/2005 | Vane et al. ............... 210/500.37 |
| 2006/0183632 | A1 | 8/2006 | Shustack et al. .............. 502/159 |
| 2007/0051680 | A1 | 3/2007 | Vane et al. .................... 210/639 |

FOREIGN PATENT DOCUMENTS

| EP | 0 470 340 | 2/1992 |
| EP | 0 674 937 | 10/1995 |
| EP | 1 600 096 | 11/2005 |
| EP | 1 897 607 | 3/2008 |
| WO | 02/058205 | 7/2002 |
| WO | 02/074421 | 9/2002 |
| WO | 2005/089907 | 9/2005 |
| WO | 2006/050531 | 5/2006 |

OTHER PUBLICATIONS

Deng et al., "PVA/PVAm blend FSC membrane for CO2-capture", Desalination, Elsevier, Amersterdam, NL, vol. 199, No. 1-3, Nov. 20, 2006, pp. 523-524.

Matsuyama H. et al., "Facilitated transport of CO2 through polyethylenimine/poly(vinyl alcohol) blend membrane", Journal of Membrane Science, Elsevier Scientific Publ. Company, Amsterdam, NL. vol. 163, No. 2. Nov. 1, 1999, pp. 221-227.

(Continued)

*Primary Examiner* — Ling Xu
(74) *Attorney, Agent, or Firm* — Joseph M. Homa

(57) ABSTRACT

Hybrid membrane structures that include: an inorganic porous support that includes first and second ends, and a plurality of inner channels having surfaces defined by porous walls and extending through the support from the first to the second ends; optionally, one or more porous inorganic intermediate layers coating the inner channel surfaces; and a polymeric amine-containing membrane.

16 Claims, 14 Drawing Sheets

OTHER PUBLICATIONS

Schreuder-Gibson, H. "Reactive Materials Research for Self-Detoxifying CB Protective Clothing", U.S. Army Natick Solder Center, Natick, MA, http://www.dtic.mil/ndia/2006cbip/schreudergibso.pdf.

Meulenberg, W.A., "Development of microporous and dense inorganic membranes for the separation of the technically relevant gases, O2/N2, CO2/H2 and CO2/N2, in fossil power plant processes.", Membrane development, Details IWV-1, http://www.co2separation.com/engl/membranes/details, last change Oct. 31, 2005.

"Various Technologies: System and Methods for CO2 Selection and Separation", Wyoming rpc Research Products Center, WU Technologies Available for Licensing, http://uwadmnweb.uwyo.edu/rpc/UWTechs/VariousCO2Technologies.asp.

Martel, B.; Ruffin, D.; Weltrowski, M.; Lekchiri, Y.; Morcellet, M. "Water-soluble polymers and gels from the polycondensation between cyclodextrins and poly(carboxylic acid)s: A study of the preparation parameters", Journal of Applied Polymer Science (2005), 97(2), 433-442.

Shekarriz, S.; Cohen, P.; Carr, C. M.; Mitchell, R.; Jones, C. "Surface chemical analysis of 1,2,3,4-butanetetracarboxylic acid modified cotton". Journal of Materials Science (2003), 38(13), 2945-2951.

Diaf, A., et al. "Polymeric sorbents for CO2, SO2, and NOx. Structure-sorption properties relationships", University of Pittsburgh, PA, AIChE Symposium Series (1995), 309, 49-60, Abstract.

Shu, Paul; Schmitt, Kirk D. "Systematic design of profile control chemistry: control of gelation of mixed poly(vinyl alcohol-co-vinyl amine) crosslinked with dialdehydes". Colloids and Surfaces A: Physicochemical and Engineering Aspects 1996, 110(3), 273-285), Abstract.

Yang, Charles Q.; Qian, Lei; Lickfield, Gary C. "Mechanical strength of durable press finished cotton fabric. Part IV: abrasion resistance". Textile Research Journal (2001), 71(6), 543-548, Abstract.

Kang, Ji-Yun; Deivasigamani, Jayakumar; Sarmadi, Majid. "Dyeability of cotton fabrics crosslinked with BTCA". AATCC Review (2004), 4(4), 28-31, Abstract.

Hong, Hyun Pil; Ko, Sohk Won, "Crosslinking reaction of silk with 1,2,3,4-butanetetracarboxylic acid", Han'guk Somyu Konghakhoechi (1997), 34(3), 164-170, Abstract.

Zhang, Keda; Fu, Shenquan, "PVA pervaporation membrane crosslinked by polyacid", Mo Kexue Yu Jishu (1993), 13(1), 19-22, Abstract.

El-Tahlawy, Khaled F.; El-Bendary, Magda A.; Elhendawy, Adel G.; Hudson, Samuel M., "The antimicrobial activity of cotton fabrics treated with different crosslinking agents and chitosan". Carbohydrate Polymers (2005), 60(4), 421-430, Abstract.

*(Prior Art)*

PEIm

PVAAm

PAAm

GPTE

POLYMER HYBRID MEMBRANE STRUCTURES

CROSS-REFERENCE TO RELATED APPLICATIONS

This application claims the benefit of priority to provisional application No. 61/000,817, titled "Polymer Hybrid Membrane Structures" filed on Oct. 29, 2007, the contents of which are incorporated by reference herein.

FIELD OF THE INVENTION

The present invention relates, generally, to hybrid membrane structures and, more particularly, to inorganic-polymer hybrid membrane structures useful for molecular level separations and methods for making the same.

BACKGROUND OF THE INVENTION

There are a number of industrial processes, such as coal gasification, biomass gasification, steam reforming of hydrocarbons, partial oxidation of natural gas, etc., which produce gas streams that include $CO_2$, $H_2$ and CO. It is frequently desirable to remove $CO_2$ from those gas mixtures to capture $CO_2$, for example for sequestration purposes and to produce $H_2$ or $H_2$-enriched gas product.

One process commonly used in the industry today involves amine-based gas scrubbers. In these scrubbers, the gas mixture is contacted with an amine-containing organic solvent or an amine-containing solution. $CO_2$ and other acidic molecules, such as $H_2S$, are selectively absorbed in the amine solution. Once the solution is saturated with $CO_2$, it is regenerated to release $CO_2$ gas molecules, and the solvent is recycled to the absorption step. Such processes can have significant drawbacks. For example, they can use large amounts of amine solvents; they can require continuous absorption/regeneration cycles; and, generally speaking, they are capital and energy-intensive processes. For at least these reasons, membrane technologies, which are known to be more energy and capital efficient than the conventional solvent-based separation processes, have been long sought.

Membranes made of polymeric materials have been developed and commercially used for molecular separation, such as separating $CO_2$ from natural gas streams. However, polymeric membranes are associated with poor thermal and chemical stability, and their permeation flux is often low. Moreover, hydrocarbons ubiquitously exist in $CO_2$ gas mixtures derived from fossil fuel sources, and these hydrocarbons can cause degradation of the polymeric membranes by dissolution, fouling, etc., further limiting widespread use of polymeric membranes.

Inorganic membranes are an emerging technology area and hold high promise to overcome the thermal and chemical stability issues that are associated with polymeric membrane materials. Among the inorganic membrane materials studied so far, zeolite or molecular sieve membranes are considered to be most promising, because zeolite materials have been used as catalysts and/or adsorbents in the industry for many decades and offer molecular-level lattice channel structures to discriminate individual molecules based on their slight difference in weight, size, and/or shape. However, $CO_2$ separation functions of inorganic membranes have not been well demonstrated yet, perhaps because making a defect-free inorganic membrane in a practical way remains a large material processing challenge. In addition, conventional inorganic membranes frequently offer much lower surface area packing density than do polymeric membranes because of the inorganic membrane's tubular or planar disk forms, as illustrated in FIGS. 1A and 1B. In FIGS. 1A and 1B, arrow 902 represents a gas mixture that is to be separated; arrow 904 represents permeate; and arrow 906 represents retentate. The conventional inorganic membrane technology can also impose a large manufacturing and engineering cost based on the unit-membrane-separation-area, further limiting widespread application of zeolite and other inorganic membranes.

In view of the forgoing, there is a need for materials and methods that can be used for molecular level separations, and the present invention is directed, at least in part, to addressing this need.

SUMMARY OF THE INVENTION

The present invention relates to a hybrid membrane structure that includes:

an inorganic porous support that includes a first end, a second end, and a plurality of inner channels having surfaces defined by porous walls and extending through the support from the first end to the second end;

optionally, one or more porous inorganic intermediate layers coating the inner channel surfaces of the inorganic porous support; and a polymeric amine-containing membrane; wherein, when the hybrid membrane structure does not comprise the one or more porous inorganic intermediate layers, the inner channel surfaces of the inorganic porous support comprise a median pore size of 500 nanometers or less and the polymeric amine-containing membrane coats the inner channel surfaces of the inorganic porous support; and wherein, when the hybrid membrane structure includes the one or more porous inorganic intermediate layers, the polymeric amine-containing membrane coats the surface of the one or more porous intermediate layers.

The present invention also relates to a method for making a hybrid membrane structure. The method includes:

providing an inorganic porous support that includes a first end, a second end, and a plurality of inner channels having surfaces defined by porous walls and extending through the support from the first end to the second end;

optionally applying one or more porous inorganic intermediate layers to the inner channel surfaces of the inorganic porous support; and applying a polymeric amine-containing membrane; wherein, when the one or more porous inorganic intermediate layers have not been applied to the inorganic porous support's inner channel surfaces, the inner channel surfaces of the inorganic porous support comprise a median pore size of 500 nanometers or less and the polymeric amine-containing membrane is applied to the inner channel surfaces of the inorganic porous support; and wherein, when the one or more porous inorganic intermediate layers have been applied to the inorganic porous support's inner channel surfaces, the polymeric amine-containing membrane is applied to the surface of the one or more porous intermediate layers.

These and additional features and embodiments of the present invention will be more fully illustrated and discussed in the following drawings and detailed description.

BRIEF DESCRIPTION OF THE DRAWINGS

FIG. 1A shows a perspective view of a tubular membrane. FIG. 1B shows a cross-sectional view of a planar disk membrane.

FIG. 2A is a perspective view, and FIG. 2B is a longitudinal cross-sectional view of the hybrid membrane structure shown in FIG. 2A taken through FIG. 2A's Plane A.

Figure 1A:
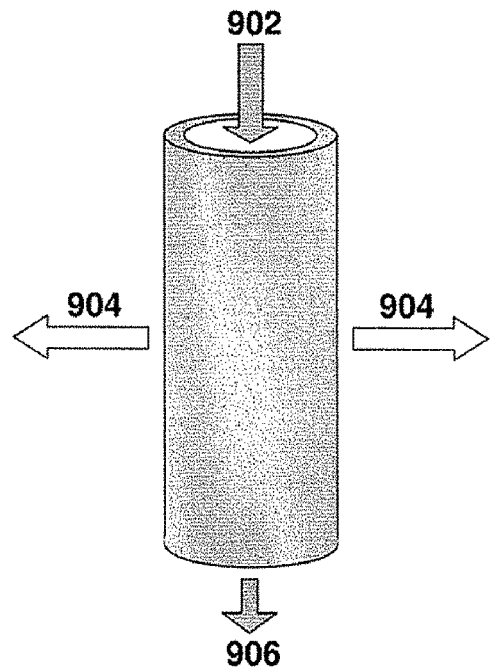
FIGS. 1A and 1B are schematic representations of prior art inorganic gas separation membrane designs and the flow of gases therein.
Figure 1B:
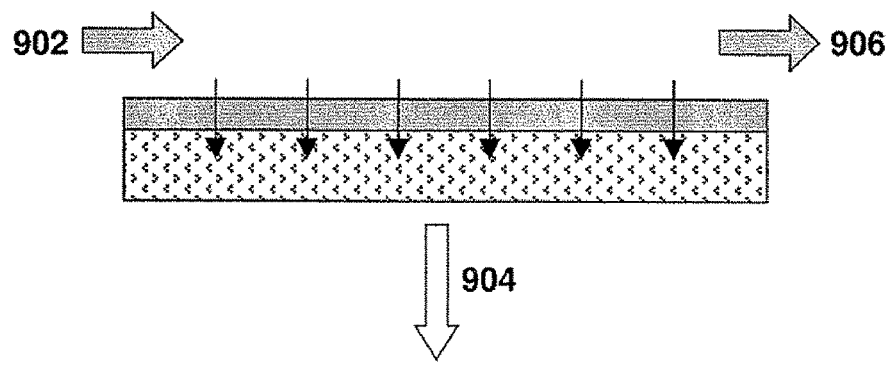

The embodiments set forth in the figures are illustrative in nature and not intended to be limiting of the invention defined by the claims. Individual features of the drawings and the invention will be more fully discussed in the following detailed description.

DETAILED DESCRIPTION OF THE INVENTION

One aspect of the present invention relates to a hybrid membrane structure that includes:

an inorganic porous support comprising a first end, a second end, and a plurality of inner channels having surfaces defined by porous walls and extending through the support from the first end to the second end;

optionally, one or more porous inorganic intermediate layers coating the inner channel surfaces of the inorganic porous support; and a polymeric amine-containing membrane; wherein, when the hybrid membrane structure does not comprise the one or more porous inorganic intermediate layers, the inner channel surfaces of the inorganic porous support comprise a median pore size of 500 nanometers or less and the polymeric amine-containing membrane coats the inner channel surfaces of the inorganic porous support; and wherein, when the hybrid membrane structure includes the one or more porous inorganic intermediate layers, the polymeric amine-containing membrane coats the surface of the one or more porous intermediate layers.

Suitable inorganic porous support materials include ceramics, glass ceramics, glasses, carbon, metals, clays, and combinations thereof. Examples of these and other materials from which the inorganic porous support can be made or which can be included in the inorganic porous support are, illustratively: metal oxide, alumina (e.g., alpha-aluminas, delta-aluminas, gamma-aluminas, or combinations thereof), cordierite, mullite, aluminum titanate, titania, zeolite, metal (e.g., stainless steel), ceria, magnesia, talc, zirconia, zircon, zirconates, zirconia-spinel, spinel, silicates, borides, alumino-silicates, porcelain, lithium alumino-silicates, feldspar, magnesium alumino-silicates, fused silica, carbides, nitrides, silicon carbides, silicon nitrides, and the like.

In certain embodiments, the inorganic porous support is primarily made from or otherwise includes alumina (e.g., alpha-alumina, delta-alumina, gamma-alumina, or combinations thereof), cordierite, mullite, aluminum titanate, titania, zirconia, zeolite, metal (e.g., stainless steel), silica carbide, ceria, or combinations thereof.

In one embodiment, the inorganic porous support is a glass. In another embodiment, the inorganic porous support is a glass-ceramic. In another embodiment, the inorganic porous support is a ceramic. In another embodiment, the inorganic porous support is a metal. In yet another embodiment, the inorganic porous support is carbon, for example a carbon support derived by carbonizing a resin, for example, by carbonizing a cured resin.

In certain embodiments, the inorganic porous support is in the form of a honeycomb monolith. Honeycomb monoliths can be manufactured, for example, by extruding a mixed batch material through a die to form a green body, and sintering the green body with the application of heat utilizing methods known in the art.

In certain embodiments, the inorganic porous support is in the form of a monolith, for instance a ceramic monolith. In certain embodiments, the monolith, for example a ceramic monolith, comprises a plurality of parallel inner channels.

The inorganic porous support can have a high surface area packing density, such as a surface area packing density of greater than 500 $m^2/m^3$, greater than 750 $m^2/m^3$, and/or greater than 1000 $m^2/m^3$.

As noted above, the inorganic porous support includes a plurality of inner channels having surfaces defined by porous walls.

The number, spacing, and arrangement of the inner channels is not particularly critical. For example the number of channels can range from 2 to 1000 or more, such as from 5 to 500, from 5 to 50, from 5 to 40, from 5 to 30, from 10 to 50, from 10 to 40, from 10 to 30, etc; and these channels can be of substantially the same cross sectional shape (e.g., circular, oval, etc.) or not. The channels can be substantially uniformly dispersed in the inorganic porous support's cross section or not (e.g., as in the case where the channels are arranged such that they are closer to the outer edge of the inorganic porous support than to the center. The channels can be arranged in a pattern (e.g., rows and columns, offset rows and columns, in concentric circles about the inorganic porous support's center, etc.).

In certain embodiments, the inner channels of the inorganic porous support have a hydraulic inside diameter of from 0.5 millimeters to 3 millimeters, such as in cases where the inner channels of the inorganic porous support have a hydraulic inside diameter of 1±0.5 millimeter, 2±0.5 millimeter, from 2.5 millimeters to 3 millimeters, and/or from 0.8 millimeters to 1.5 millimeters. In certain embodiments, the inner channels of the inorganic porous support have a hydraulic inside diameter of less than 2 millimeters. For clarity, note that "diameter" as used in this context is meant to refer to the inner channel's cross sectional dimension and, in the case where the inner channel's cross section is non-circular, is meant to refer to the diameter of a hypothetical circle having the same cross sectional area as that of the non-circular inner channel.

In certain embodiments, the porous walls which define the inner channels' surfaces have a median pore size of 25 microns or less. In certain embodiments, the porous walls which define the inner channels' surfaces have a median pore size of from 5 nanometers to 25 microns, such as in cases where the porous walls which define the inner channels' surfaces have a median pore size of 10±5 nanometers, 20±5 nanometers, 30±5 nanometers, 40±5 nanometers, 50±5 nanometers, 60±5 nanometers, 70±5 nanometers, 80±5 nanometers, 90±5 nanometers, 100±5 nanometers, 100±50 nanometers, 200±50 nanometers, 300±50 nanometers, 400±50 nanometers, 500±50 nanometers, 600±50 nanometers, 700±50 nanometers, 800±50 nanometers, 900±50 nanometers, 1000±50 nanometers, 1±0.5 microns, and/or 2±0.5 microns. In certain embodiments, the porous walls which define the inner channels' surfaces have a median pore size of 1 micron or less. In certain embodiments, the porous walls which define the inner channels' surfaces have a median pore size of 500 nanometers or less, such as in cases where the porous walls which define the inner channels' surfaces have a median pore size of from 5 nanometers to 500 nanometers, from 5 nanometers to 400 nanometers, from 5 nanometers to 300 nanometers, from 5 nanometers to 400 nanometers, from 5 nanometers to 300 nanometers, from 5 nanometers to 400 nanometers, from 5 nanometers to 200 nanometers, from 5 nanometers to 100 nanometers, from 5 nanometers to 50 nanometers, etc. For clarity, note that "size" as used in this context is meant to refer to a pore's cross sectional diameter and, in the case where the pore's cross section is non-circular, is meant to refer to the diameter of a hypothetical circle having the same cross sectional area as that of the non-circular pore.

In certain embodiments, the inorganic porous support has a porosity of from 20 percent to 80 percent, such as a porosity of from 30 percent to 60 percent, from 50 percent to 60 percent, and/or from 35 percent to 50 percent. When a metal, such as stainless steel, is used as the inorganic porous support, porosity in the stainless steel support can be effected, for example, using engineered pores or channels made by three-dimensional printing, by high energy particle tunneling, and/or by particle sintering using a pore former to adjust the porosity and pore size.

It will be appreciated that individual inorganic porous supports can be stacked or housed in various manners to form larger inorganic porous supports having various sizes, service durations, and the like to meet the needs of differing use conditions.

As noted above, the hybrid membrane structure can optionally include one or more porous inorganic intermediate layers coating the inner channel surfaces of the inorganic porous support. In certain embodiments, the hybrid membrane structure does not include the one or more porous inorganic intermediate layers; a polymeric amine-containing membrane; the inner channel surfaces of the inorganic porous support comprise a median pore size of 500 nanometers or less; and the polymeric amine-containing membrane coats the inner channel surfaces of the inorganic porous support. In other embodiments, the hybrid membrane structure does include the one or more porous inorganic intermediate layers, and the polymeric amine-containing membrane coats the surface of the one or more porous intermediate layers.

In those cases where the hybrid membrane structure does include the one or more porous inorganic intermediate layers, and the polymeric amine-containing membrane coats the surface of the one or more porous intermediate layers, it will be appreciated that the "surface of the one or more porous intermediate layers" refers to the outer surface of the intermediate layer (i.e., the surface that is exposed to the channel) or, in the case where there is more than one porous intermediate layer, to the outer surface of the outermost intermediate layer (i.e., the intermediate layer most distant from the inner channel surfaces of the inorganic porous support. In particular, the phrase "the polymeric amine-containing membrane coats the surface of the one or more porous intermediate layers" is not meant to be construed as requiring that the polymeric amine-containing membrane coat every porous intermediate layer or every side of every porous intermediate layer.

Whether or not to employ the one or more porous inorganic intermediate layers can depend on a variety of factors, such as the nature of the inorganic porous support; the median diameter of the inorganic porous support's inner channels; the use to which the hybrid membrane structure is to be put and the conditions (e.g., gas flow rates, gas pressures, etc.) under which it will be employed; the roughness or smoothness of the inner channels' surfaces; the median pore size of the porous walls which define the inner channels' surfaces; and the like.

By way of illustration, in certain embodiments, the porous walls of the inorganic porous support comprise a median pore size that is sufficiently small so that, when the polymeric amine-containing membrane is coated directly on the inner channels' surfaces, the resulting coating is smooth. Examples of median pore sizes that are thought to be sufficiently small so as not to significantly benefit (in terms of smoothness of the polymeric amine-containing membrane coating) from the use of the porous inorganic intermediate layer(s) (for at least some applications) are those that are less than about 100 nanometers. Even less benefit is attained when the median pore size is less than about 80 nanometers; still less benefit is attained when the median pore size is less than about 50 nanometers (e.g., in the 5 nanometer to 50 nanometer range.

By way of further illustration, in certain embodiments, the porous walls of the inorganic porous support comprise a median pore size that is sufficiently large so that, when the polymeric amine-containing membrane is coated directly on the inner channels' surfaces, the resulting coating may be rough. In such cases, it may be advantageous to use the porous inorganic intermediate layer(s). Examples of median pore sizes that are thought to be sufficiently large so as to significantly benefit (in terms of smoothness of the polymeric amine-containing membrane coating) from the use of the porous inorganic intermediate layer(s) (for at least some applications) are those that are more than about 100 nanometers. Even greater benefit is attained when the median pore size is more than about 200 nanometers; still greater benefit is attained when the median pore size is more than about 300 nanometers (e.g., in the 300 nanometer to 50 micron range.

Illustratively, in certain embodiments, the porous walls of the inorganic porous support have a median pore size of from 5 nanometers to 100 nanometers (e.g., from 5 nanometers to 50 nanometers), the hybrid membrane structure does not include the one or more porous inorganic intermediate layers, and the polymeric amine-containing membrane coats the inner channel surfaces of the inorganic porous support. In other embodiments, the porous walls of the inorganic porous support have a median pore size of from 50 nanometers to 25 microns (e.g., from 100 nanometers to 15 microns), the hybrid membrane structure includes the one or more porous inorganic intermediate layers, and the polymeric amine-containing membrane coats the surface of the one or more porous intermediate layers.

As noted above, the one or more porous inorganic intermediate layers can be used to increase the smoothness of surface onto which the polymeric amine-containing membrane is coated (e.g., to improve flow of a gas that may pass through the channels; to improve uniformity of the polymeric amine-containing membrane coating; to decrease the number and/or size of any gaps, pinholes, or other breaks in the polymeric amine-containing membrane coating; to decrease the thickness of the polymeric amine-containing membrane coating needed to achieve a polymeric amine-containing membrane coating having an acceptably complete coverage (e.g. no or an acceptably small number of gaps, pinholes, or other breaks). Additionally or alternatively, the one or more porous inorganic intermediate layers can be used to decrease the effective diameter of the inorganic porous support's inner channels. Still additionally or alternatively, the one or more porous inorganic intermediate layers can be used to alter the chemical, physical, or other properties of the surface onto which the polymeric amine-containing membrane is coated.

Examples of materials from which the one or more porous inorganic intermediate layers can be made include metal oxides, ceramics, glasses, glass ceramics, carbon, and combinations thereof. Other examples of materials from which the one or more porous inorganic intermediate layers can be made include cordierite, mullite, aluminum titanate, zeolite, silica carbide, and ceria. In certain embodiments, the one or more porous inorganic intermediate layers are made from or otherwise include alumina (e.g., alpha-alumina, delta-alumina, gamma-alumina, or combinations thereof), titania, zirconia, silica, or combinations thereof.

In certain embodiments, the median pore size of each of the one or more porous inorganic intermediate layers is larger than the median pore size of the inorganic porous support's porous walls. By way of illustration, the one or more porous intermediate layers can comprise a median pore size of from 5 nanometers to 100 nanometers, such as from 5 nanometers to 50 nanometers, from 5 nanometers to 40 nanometers, from 5 nanometers to 30 nanometers, 10±5 nanometers, 20±5 nanometers, 30±5 nanometers, 40±5 nanometers, 50±5 nanometers, 60±5 nanometers, 70±5 nanometers, 80±5 nanometers, and/or 90±5 nanometers. Where two or more porous intermediate layers are present, each of the two or more porous intermediate layers can have the same median pore size or some or all of them can have different median pore sizes.

In certain embodiments, the hybrid membrane structure includes two or more porous intermediate layers, the median pore size of the porous intermediate layer which contacts the inorganic porous support is greater than the median pore size of the porous intermediate layer which contacts the polymeric amine-containing membrane. Illustratively, in cases where the inorganic porous support has a median pore size larger than 300 nm (e.g., larger than 500 nm, larger than 1 micron, larger than 2 microns, larger than 3 microns, etc.) the hybrid membrane structure can include two porous intermediate layers: the first layer (i.e., the one that is in contact with the inorganic porous support) having a median pore size that is smaller than the inorganic porous support's median pore size (e.g., having a median pore size of from 100 nm to 200 nm) and the second layer (i.e., the one that is in contact with the polymeric amine-containing membrane) having a median pore size that is smaller than the first layer's median pore size (e.g., having a median pore size of from 5 nm to 50 nm). Such arrangements can be used to provide a smooth surface onto which the polymeric amine-containing membrane is coated without unacceptably decreasing permeability from the inner channels, through the pores of the first intermediate layer, through the larger pores of the second intermediate layer, through the still larger pores of the inorganic porous support, and to the outside of the inorganic porous support.

In those cases where the hybrid membrane structure includes the one or more porous intermediate layers, the one or more porous intermediate layers can have a combined thickness of from 1 micron to 100 microns, such as from 2 microns to 80 microns, from 5 microns to 60 microns, 10 microns to 50 microns, etc.

As noted above, irrespective of whether or not the hybrid membrane structure includes the one or more porous intermediate layers, the hybrid membrane structure also includes a polymeric amine-containing membrane. In those cases where the hybrid membrane structure does not include the one or more porous inorganic intermediate layers, the polymeric amine-containing membrane coats the inner channel surfaces of the inorganic porous support. In those cases where the hybrid membrane structure does include the one or more porous inorganic intermediate layers, the polymeric amine-containing membrane coats the surface of the one or more porous intermediate layers.

It will be appreciated that not all the channels need be coated with the polymeric amine-containing membrane. For example, the polymeric amine-containing membrane can coat all of the inner channel surfaces of the inorganic porous support; or the polymeric amine-containing membrane can coat some of the inner channel surfaces of the inorganic porous support; and the phrase "the polymeric amine-containing membrane coats the inner channel surfaces of the inorganic porous support" is meant to encompass both situations. Likewise, in those cases where the porous intermediate layer(s) is employed, the polymeric amine-containing membrane can coat the surface of the one or more porous intermediate layers in every channel; or the polymeric amine-containing membrane can coat the surface of the one or more porous intermediate layers in some of the channels; and the phrase "the polymeric amine-containing membrane coats the surface of the one or more porous intermediate layers" is meant to encompass both situations. Illustratively, depending on the expected conditions of use and the configuration of the channels in the inorganic porous support, it may be desirable to plug certain channels in the inorganic porous support, and these channels need not be coated with the polymeric amine-containing membrane; or it may be desirable not to plug certain channels in the inorganic porous support and not to coat these channels with the polymeric amine-containing membrane; or both.

In certain embodiments, the polymeric amine-containing membrane has a thickness of from 1 micron to 60 microns. In certain embodiments, the polymeric amine-containing membrane has a thickness of from 1 micron to 30 microns. Other examples of suitable thicknesses for the polymeric amine-containing membrane include 2±1 microns, 5±2 microns, 10±5 microns, 20±5 microns, 30±5 microns, 40±5 microns, 50±5 microns, and/or from 55 microns to 60 microns. In other embodiments, the polymeric amine-containing membrane has a thickness of less than 1 micron, for example a thickness of 500 nm or less, 400 nm or less, 300 nm or less, 200 nm or less, or 100 nm or less.

In certain embodiments, the thickness of the membrane is substantially uniform. In certain embodiments, the membrane is substantially uniformly thick and has a thickness of from 1 micron to 60 microns. In certain embodiments, the membrane is substantially uniformly thick and has a thickness of less than 1 micron.

In certain embodiments, the polymeric amine-containing membrane is non-porous or is porous with pores having a median pore size of less than 1 nanometer. In certain embodiments, the polymeric amine-containing membrane is non-porous. In certain embodiments, the polymeric amine-containing membrane includes pores having a median pore size of 300 nm or less, such as in cases where the polymer membrane includes pores having a median pore size of 250 nm or less, of 200 nm or less, of 150 nm or less, of 100 nm or less, of 75 nm or less, of 50 nm or less, of 40 nm or less, of 30 nm or less, of 20 nm or less, of 10 nm or less, of 5 nm or less, of 4 nm or less, of 3 nm or less, of 2 nm or less, of 1 nm or less, of 0.5 nm or less, of 0.4 nm or less, of 0.3 nm or less, of 0.2 nm or less, of 0.1 nm or less.

For certain applications, it may be desirable that the polymeric amine-containing membrane coats the entire surface of the porous intermediate layer(s) or the entire inner channel surfaces of the inorganic porous support, for example such that none or substantially none (e.g., less than 20%, less than 10%, less than 5%, less than 1%, less than 0.1%, less than 0.01%, etc.) of a gaseous component of a feed gas (e.g., $H_2$, CO, etc.) in the inner channels permeates to the outside of the inorganic porous support. As further illustration, for certain applications, it may be desirable that the number and/or size of any gaps, pinholes, or other breaks in the polymeric amine-containing membrane coating be small in size and few in number (e.g., as in the case where there are no gaps, pinholes, or other breaks in the polymeric amine-containing membrane coating or as in the case where the collective area of any gaps, pinholes, or other breaks in the polymeric amine-containing membrane coating is less than 1% (such as less than 0.1%, 0.01%, etc.) of the total surface area coated by the polymeric amine-containing membrane coating.

As used herein, "polymeric amine-containing membrane" means any membrane than includes a polyamine. Polyamines are meant to refer to any polymer that includes a repeating amine, such as a repeating primary amine, a repeating secondary amine, a repeating tertiary amine, a repeating primary quaternary amine, or combinations thereof. The repeating amine can be bonded directly to the polymer backbone (e.g., as in the case of polyvinylamine); or it can be contained in a repeating functional group (e.g., as in the case of polyallylamine and as in the case of the primary amine in polyethylenimine); or it can be part of the backbone (e.g., as in the case of the secondary amine in polyethylenimine).

The repeating amine may be provided by either monomers, amino-functionalized cross-linkers, or both.

Suitable polyamines include, for example, polyallylamines, polyvinylamines, polyvinylpyridines (e.g., poly(2-vinylpyridine) and poly(4-vinylpyridine)), and polyaminoalkylmethacrylates (e.g., polyaminoethylmethacrylates and polydimethylaminoethylmethacrylates and other polydialkylaminoethylmethacrylates). Other suitable polyamines include, for example, polyethylenimine, polyvinylimidazole, and polymers that include quaternary ammonium salts, such as polydiallyldimethylammonium chloride and those having the formula:

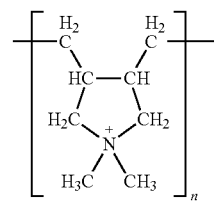

Still other suitable polyamines include, for example, copolymers of different amino-functionalized monomers (random copolymers, sequential copolymers, block copolymers, graft copolymers, etc.), such as poly(vinyl alcohol-co-vinylamine), poly(dimethylaminoprolyl methacrylamide-co-hydroxyethyl methacrylate), poly(vinylpyrrolidone-co-dimethylaminoethylmethacrylate), and copolymers having the following formula:

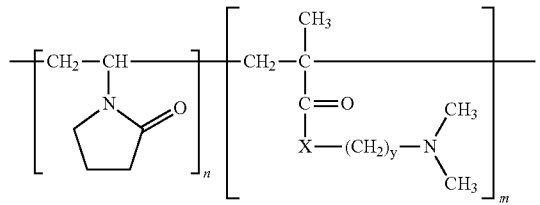

in which X can be, for example, O or NH and in which y can be, for example 2 or 3; and amino-dendrimers/star polymers and copolymers, such as those having the formula:

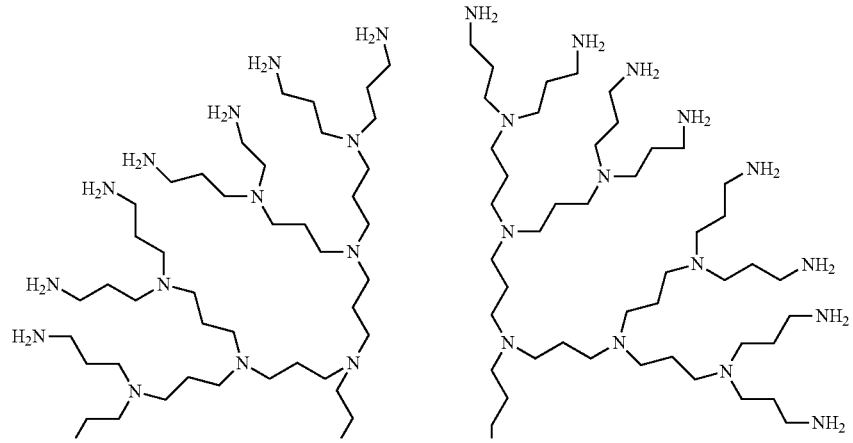

-continued
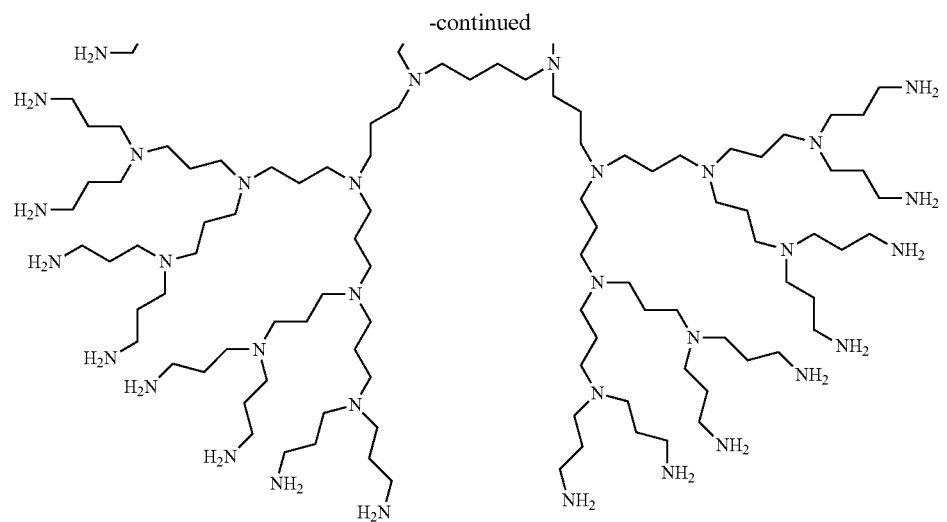
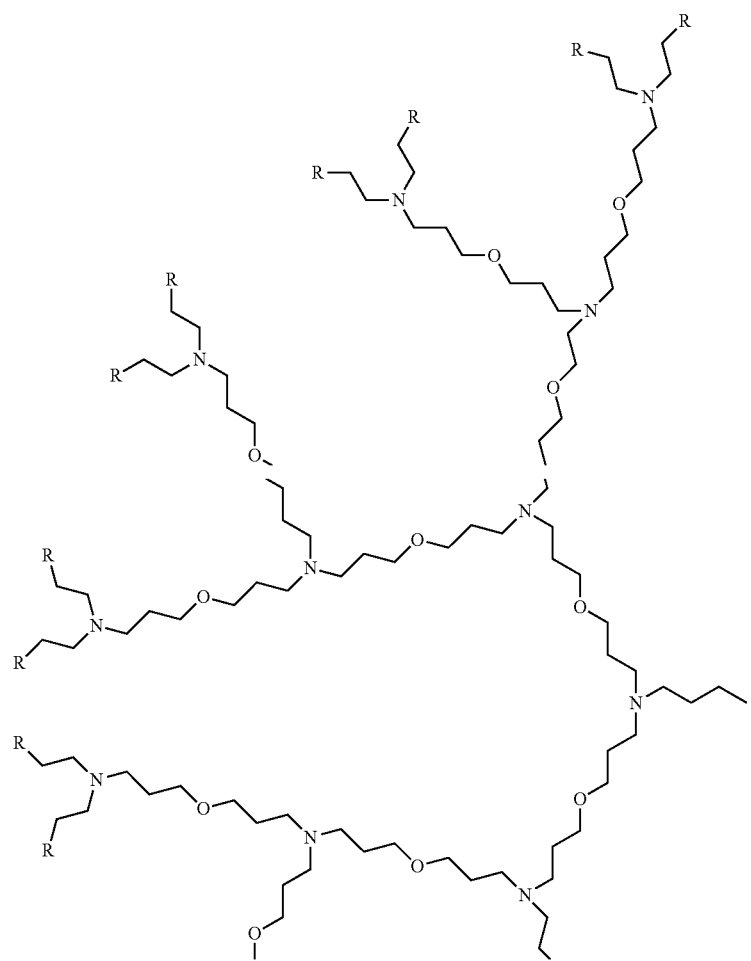

-continued
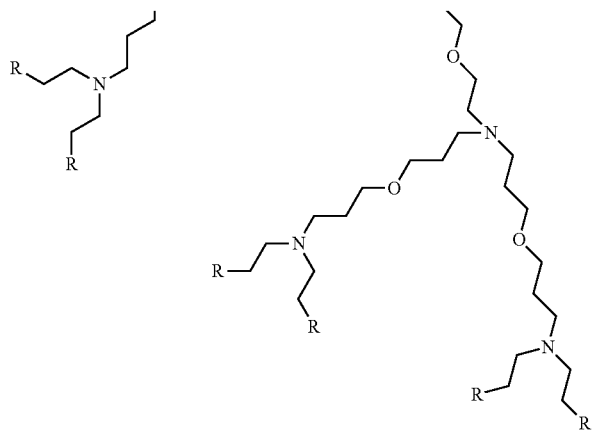
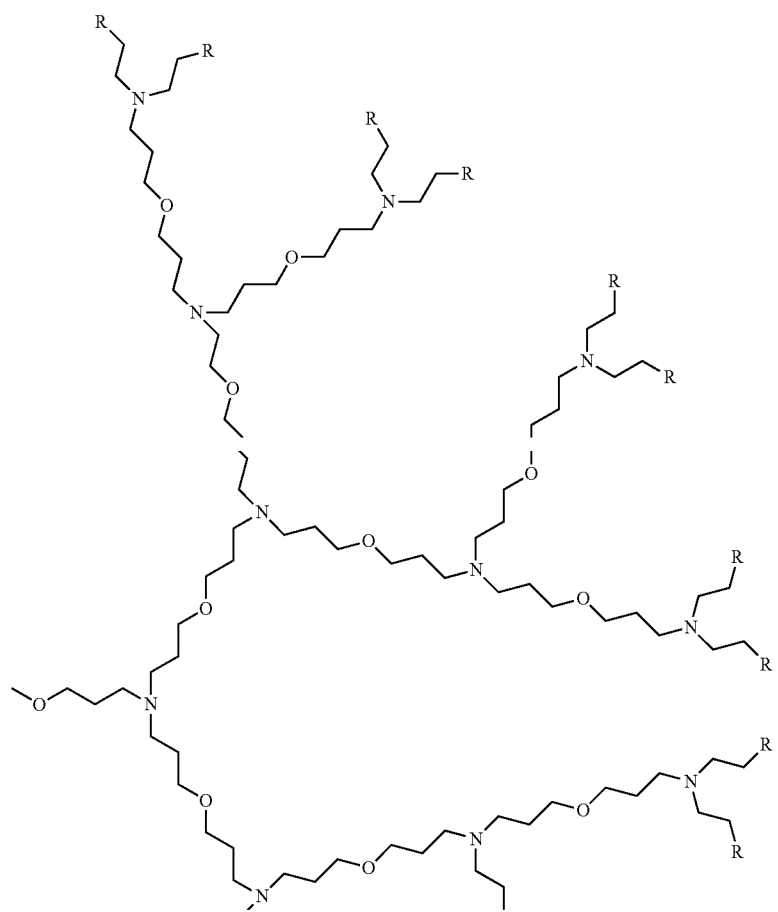

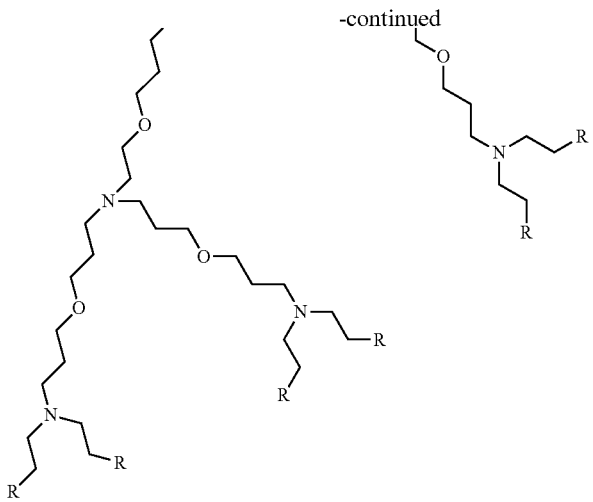

wherein R may represent, for example, H, alkyl, aryl, OH, etc.

Still other suitable polyamines include, for example, polymers that comprise both alcohol (OH) and amine (e.g., primary, secondary, tertiary, or quaternary) functional groups. Examples of such polymers that comprise both alcohol (OH) and amine (e.g., primary, secondary, tertiary, or quaternary) functional groups include poly(aminoprolyl methacrylamide-co-hydroxyalkyl methacrylate), such as poly(aminopropyl methacrylamide-co-hydroxyethyl methacrylate), e.g., having the following formula:

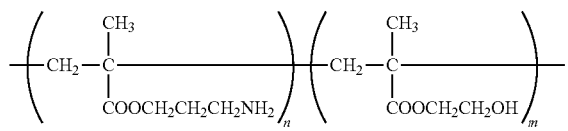

as well as copolymers of dimethylamine and epichlorohydrin, e.g., having the following formula:

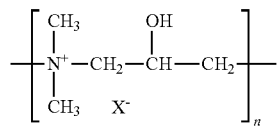

Still other suitable polyamines include, for example, polyaminoacids, in neat or salt (e.g., hydrochloride salt, hydrobromide salt, etc) form, such as poly-L-arginine, poly-D-lysine, poly-DL-onithine, poly-L-histidine, as well as copolymers (e.g., random copolymers, sequential copolymers, block copolymers, graft copolymers, etc.) thereof.

Still other suitable polyamines include polymers containing N-heterocycles or hydrazines. Example polyamines include Poly(acrylamide-co-diallyldimethylammonium chloride)

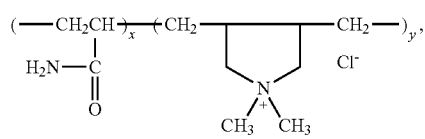

Poly[N,N'-bis(2,2,6,6-tetramethyl-4-piperidinyl)-1,6-hexanediamine-co-2,4-dichloro-6-morpholino-1,3,5-triazine]

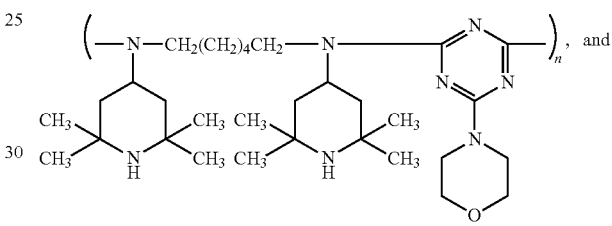

alkoxylated polyamine, e.g. polyethylenimine, ethoxylated

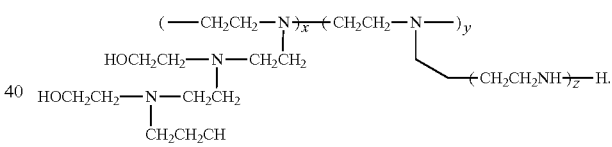

Combinations of these or other polyamines can also be used.

In certain embodiments, the polymeric amine-containing membrane is made from or otherwise comprises crosslinked polyamines. In certain embodiments, the polymeric amine-containing membrane is made from or otherwise comprises polyamines crosslinked with an epoxy crosslinker. In certain embodiments, the polymeric amine-containing membrane is made from or otherwise comprises a crosslinked polyallylamine, a crosslinked polyethylenimine, or combinations thereof. In certain embodiments, the polymeric amine-containing membrane is made from or otherwise comprises a polyallylamine, a polyethylenimine, or combinations thereof crosslinked with an epoxy crosslinker. In certain embodiments, the polymeric amine-containing membrane is made from or otherwise comprises a crosslinked polyallylamine and a crosslinked poly(vinyl alcohol-co-vinylamine). In certain embodiments, the polymeric amine-containing membrane is made from or otherwise comprises a polyallylamine and a poly(vinyl alcohol-co-vinylamine) crosslinked with an epoxy crosslinker.

The hybrid membrane structure can include other layers (i.e., in addition to the optional one or more porous inorganic intermediate layers and the polymeric amine-containing membrane layer. For example, the hybrid membrane structure can further include a polymeric protection layer coated on the polymeric amine-containing membrane's surface.

In certain embodiments, the polymeric protection layer is thinner than the polymeric amine-containing membrane. Illustratively, the polymeric protection layer can have a thickness of from 1 micron to 10 microns, such as in the case where the polymeric protection layer has a thickness of 2±1 microns, 3±1 microns, 4±1 microns, 5±1 microns, 6±1 microns, 7±1 microns, 8±1 microns, an/or 9±1 microns.

In certain embodiments, the polymeric protection layer includes a hydrophilic polymer. Suitable hydrophilic polymers for use in the polymeric protection layers include, for example, alcohol polymers, such as polyvinylalcohols, polyallylalcohols, and poly(hydroxyalkyl methacrylate)s (e.g., poly(hydroxyethyl methacrylate)s). Other suitable hydrophilic polymers include, for example, copolymers of different alcohol-functionalized monomers (random copolymers, sequential copolymers, block copolymers, graft copolymers, etc.), such as poly(vinyl alcohol-co-vinylamine), poly(aminoprolyl methacrylamide-co-hydroxyethyl methacrylate), poly(vinylpyrrolidone-co-dimethylaminoethylmethacrlate), and copolymers having the following formula:

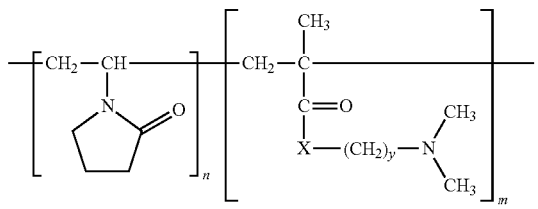

in which X can be, for example, O or NH and in which y can be, for example 2 or 3. Still other suitable hydrophilic polymers include, for example, polymers that comprise both alcohol (OH) and amine (e.g., primary, secondary, tertiary, or quaternary) functional groups. Examples of such polymers that comprise both alcohol (OH) and amine (e.g., primary, secondary, tertiary, or quaternary) functional groups include poly(aminoprolyl methacrylamide-co-hydroxyalkyl methacrylate), such as poly(aminopropyl methacrylamide-co-hydroxyethyl methacrylate), e.g., having the following formula:

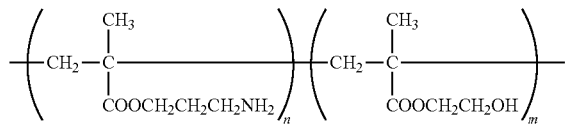

as well as copolymers of dimethylamine and epichlorohydrin, e.g., having the following formula:

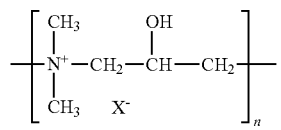

In certain embodiments, the polymeric protection layer is a membrane comprising a hydrophilic polymer and a polyamine. Suitable polyamines for use in the polymeric protection layers include, for example, polyallylamine and polyvinylamine. In certain embodiments, the polymeric protection layer is a membrane comprising a polyallylamine and a poly(vinyl alcohol-co-vinylamine). In certain embodiments, the polymeric protection layer is a membrane comprising crosslinked polyallylamine and poly(vinyl alcohol-co-vinylamine). In certain embodiments, the polymeric protection layer is a membrane comprising a polyallylamine and a poly(vinyl alcohol-co-vinylamine) crosslinked with an epoxy crosslinker. In certain embodiments, the polymeric protection layer is a membrane comprising poly(vinyl alcohol-co-vinylamine), which can be crosslinked with, for example, an epoxy crosslinker.

The polymeric amine-containing membrane and/or polymeric protection layer can include other materials. By way of illustration, in certain embodiments, the polymeric amine-containing membrane and/or polymeric protection layer includes a mobile non-polymeric amine. As used herein, "mobile non-polymeric amine" is meant to refer to low molecular weight chemicals (e.g., molecular weights of under 500 g/mol, such as under 400 g/mol, under 300 g/mol, under 200 g/mol, under 100 g/mol, etc.) that contain one or more amine functional groups. The amine functional groups can be primary amine functional groups, secondary amine functional groups, or tertiary amine functional groups, and the mobile non-polymeric amine can contain combinations of these kinds of amine functional groups. For example, in certain embodiments, the non-polymeric amine is a non-polymeric tertiary amine (i.e., in which the amine functional group is a tertiary amine or, in cases where the non-polymeric amine contains more than one amine functional group, in which all of the amine functional groups are tertiary amines). Illustratively, suitable mobile non-polymeric amines include glycine, glycine salts (e.g., glycine sodium salt, glycine potassium salt, etc.), hexyldiamine, and N,N-dimethylethyldiamine. Other suitable mobile non-polymeric amines include amino acids (in neat form or in a salt form), such as alanine, glycine, dimethylglycine, arginine, histidine, lysine, etc. Combinations of these or other mobile non-polymeric amines can also be used.

It is believed that the mobile non-polymeric amines can act as a mobile phase of absorbents within the polymer membrane, which can be particularly useful when the polymer membrane is used in certain applications (e.g., for separating $CO_2$ from a feed gas).

Polymer membranes that include a mobile non-polymeric amine can be produced in a variety of ways. For example, the non-polymeric amine can be incorporated into the membrane precursor composition prior to casting the film. In those cases where the membrane precursor composition includes a polycarbodiimide crosslinking agent (e.g., CARBODILITE™ V-02) or a polyacid crosslinking agent (e.g., BTCA), it may be desirable to use a tertiary non-polymeric amine, so as to avoid interaction between the non-polymeric amine and the polycarbodiimide or polyacid crosslinking agent (which could reduce or otherwise adversely affect the non-polymeric amine's mobility).

Additionally or alternatively, the non-polymeric amine can be incorporated into the film after casting but before curing. This can be carried out, for example, by contacting the film, prior to curing, with the non-polymeric amine. The film is contacted with the non-polymeric amine under conditions effective for the non-polymeric amine to disperse in the film. Illustratively, depending on the nature of the non-polymeric amine and whether contact is carried out before or after drying, contacting can be carried out neat in the form of a liquid; in the form of a vapor; or in the form of a solution, dispersion, or suspension. For example, the non-polymeric amine or solution, dispersion, or suspension containing the non-polymeric amine can be contacted with the film by dipping, spraying, painting, spin-coating, flowing, and the like. In those cases where a polycarbodiimide crosslinking agent (e.g., CARBODILITE™ V-02) or a polyacid crosslinking agent (e.g., BTCA) is employed, it may be desirable to use a tertiary non-polymeric amine, so as to avoid interaction between the non-polymeric amine and the polycarbodiimide or polyacid crosslinking agent during the curing process (which, as noted above, could adversely affect the non-polymeric amine's mobility).

Still additionally or alternatively, the non-polymeric amine can be incorporated into the film after curing. This can be carried out, for example, by contacting the film, after curing, with the non-polymeric amine under conditions effective for the non-polymeric amine to disperse in the cured film. Illustratively, depending on the nature of the non-polymeric amine and the swelling characteristics of the cured film, contacting can be carried out neat in the form of a liquid; in the form of a vapor; or in the form of a solution, dispersion, or suspension. The crosslinked film will typically swell in water and other suitable solvents, which property can be readily exploited to effect dispersal of the non-polymeric amine into the cured film. For example, the non-polymeric amine or solution, dispersion, or suspension containing the non-polymeric amine can be contacted with the film by dipping, spraying, painting, spin-coating, flowing, and the like. The non-polymeric amine can be a tertiary non-polymeric amine, or it can be a non-polymeric amine that contains primary and/or secondary amine functional groups.

In certain embodiments, the polymeric protection layer is a membrane that is non-porous or is porous with pores having a median pore size of less than 1 nanometer. For certain applications, it may be desirable that the polymeric protection layer be a membrane that coats the polymeric amine-containing membrane's surface in its entirety (e.g., without any substantial gaps, pinholes, or other breaks).

The polymeric protection layer can be used to protect the underlying polymeric amine-containing membrane from physical, chemical, or other forms of degradation caused by, for example, materials that are introduced into the channels when the hybrid membrane structures are put into use.

Illustratively, in the case where the hybrid membrane structures are used in gas separations, the polymeric protection layer can be used to protect the underlying polymeric amine-containing membrane from physical or chemical degradation caused by, for example, gases and other chemicals that may be present in the feed gas. The polymeric protection layer may serve other protective functions (i.e., other than protecting the underlying polymeric amine-containing membrane from degradation), for example, by protecting the hybrid membrane structure's efficiency, useful life, etc., when it is used, for example, in gas separation applications. By way of illustration, the polymeric protection layer may serve to protect the hybrid membrane structure from the adverse effects of adsorption of or fouling by materials contained in feed gases.

Certain embodiments of the present invention can have advantages over prior art polymer membranes and prior art inorganic membranes, for example, in terms of durability and/or strength; in terms of regeneration or refurbishment; and/or in terms of permeation flux (for structures to be used in gas separation applications).

By way of illustration, in certain embodiments of the hybrid membrane structures of the present invention, the inorganic porous support structure can provide a backbone for surface area, mechanical strength, and durability; and use of the inorganic porous support can also overcome the thermal and chemical stability issues associated with pure polymeric membranes, while providing surface area packing density comparable to the pure polymeric membranes.

Additionally or alternatively, in certain embodiments of the hybrid membrane structures of the present invention, the inorganic porous support structure can facilitate regeneration or refurbishment of the hybrid membrane structures. Illustratively, the inorganic porous support can be a major cost factor in the production of the hybrid membrane structures, while the preparation of the polymeric membrane coating itself can be significantly less costly. The inorganic porous support structure can offer thermal stability at high temperatures (e.g., at calcination temperature>900° C.) at which all the organic materials can be burnt out. This feature can permit the inorganic porous support structure (with or without the one or more inorganic intermediate layers) to be reused. For example, when the hybrid membrane structure is degraded, the polymeric amine-containing membrane layer (and any polymeric protection layer that may be present) can be burnt out, and the inorganic porous support structure (and the optional one or more porous inorganic intermediate layers that coat the inner channel surfaces of the inorganic porous support) can be readily refurbished with a new polymeric amine-containing membrane layer (and, if desired, a new polymeric protection layer).

Still additionally or alternatively, in certain embodiments of the hybrid membrane structures of the present invention, the inorganic porous support can have a substantially uniform pore structure on the inorganic porous support channel surfaces (or substantially uniform pore structure can be generated by the use of the optional one or more porous inorganic intermediate layers). This can enable deposition of a thin and durable polymeric amine-containing membrane layer (e.g., by a simple coating process with solution chemistry); and the thin polymeric amine-containing membrane layer can offer high permeation flux. The hybrid membrane structures can thus provide a large potential advantage in manufacturing cost relative to the cost of manufacturing prior art inorganic membranes.

It will be appreciated that all, some, or none of the advantages discussed above may or may not be achieved in a particular hybrid membrane structure of the present invention.

For example, a particular hybrid membrane structure of the present invention may be designed with other considerations in mind, and these other considerations may reduce or negate some or all of the above-discussed advantages or other advantages.

The advantages discussed above are not meant to be limiting, and they are not to be construed, in any way, as limiting the scope of the invention.

Figure 2A:
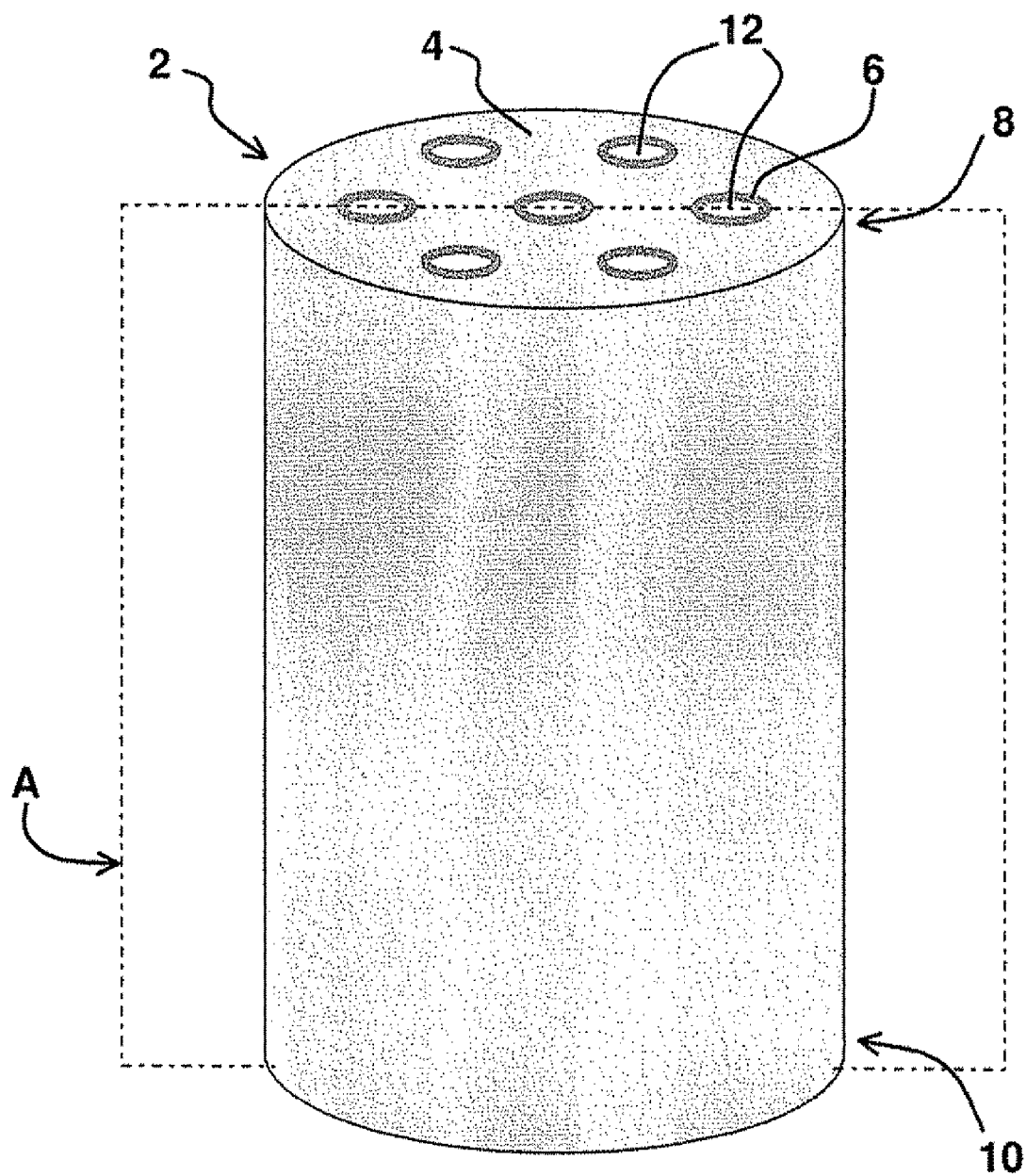
FIGS. 2A and 2B are schematic representations of a hybrid membrane structure according to the present invention.
Figure 2B:
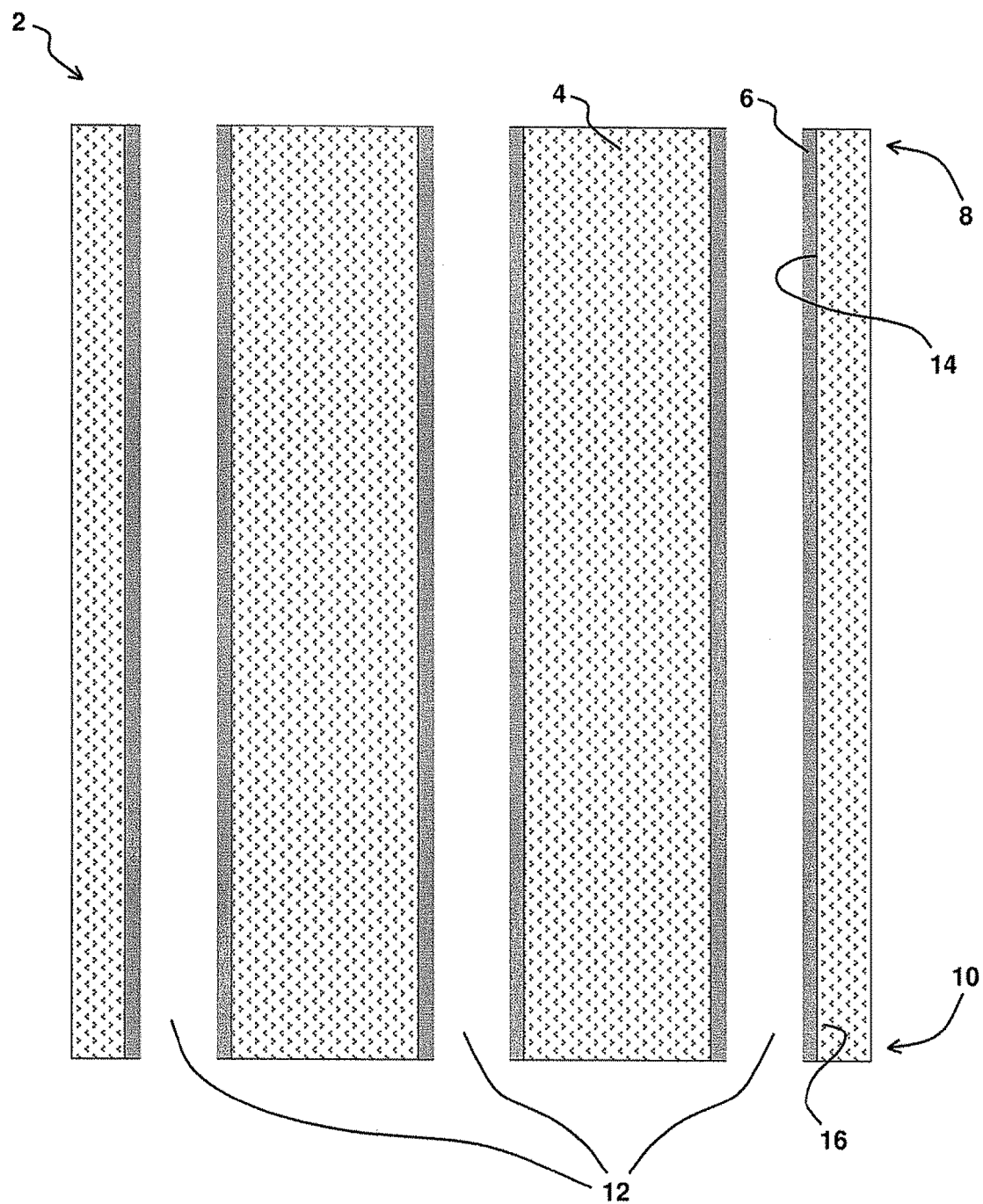

Referring to FIGS. 2A and 2B, an exemplary hybrid membrane structure 2 is illustrated. FIG. 2A is a perspective view, and FIG. 2B is a longitudinal cross-sectional view of the hybrid membrane structure shown in FIG. 2A taken through FIG. 2A's Plane A. In this embodiment, hybrid membrane structure 2 includes inorganic porous support 4 and polymeric amine-containing membrane 6, and no porous inorganic intermediate layers are employed in this embodiment. Inorganic porous support 4 is shown as including first end 8, second end 10, and plurality of inner channels 12 that extend through inorganic porous support 4 from first end 8 to second end 10. Inner channels 12 have surfaces 14 defined by porous walls 16, and polymeric amine-containing membrane 6 coats surfaces 14 of inner channels 12.

Figure 3A:
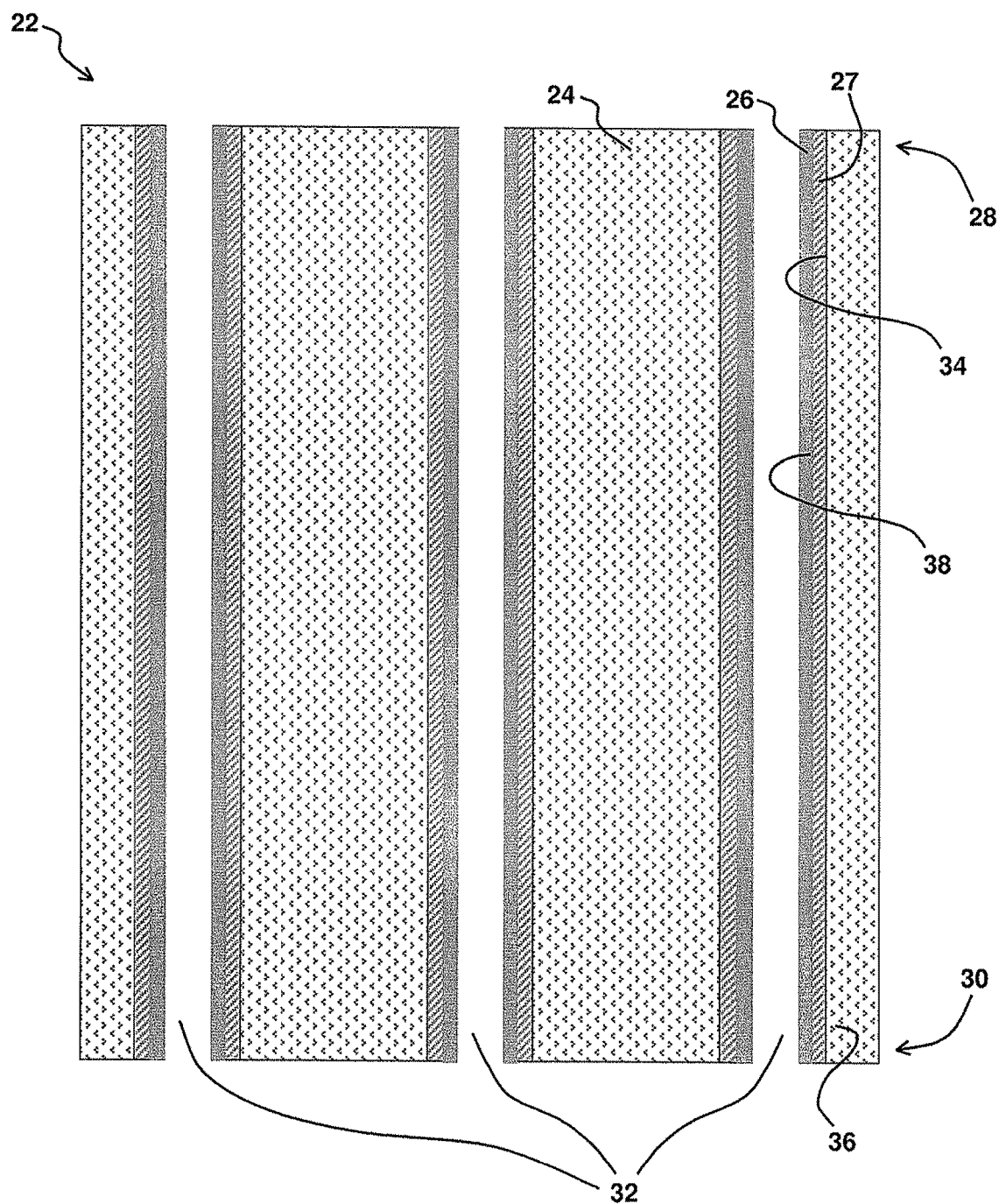
FIGS. 3A and 3B are longitudinal cross-sectional schematic representations of hybrid membrane structures according to the present invention.
Figure 3B:
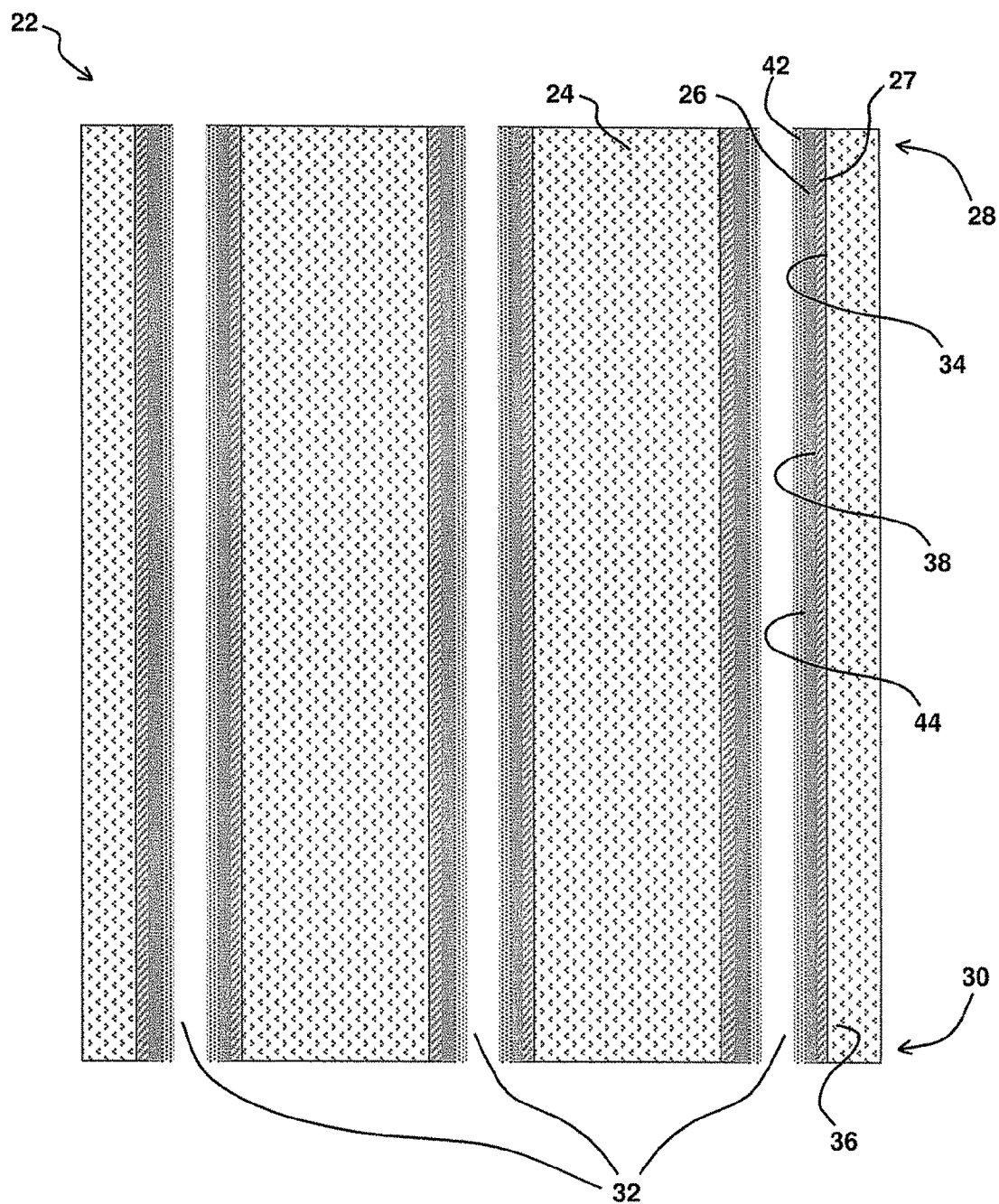

Other exemplary hybrid membrane structures 22 are illustrated in FIGS. 3A and 3B. In these embodiments, hybrid membrane structure 22 includes inorganic porous support 24, polymeric amine-containing membrane 26, and porous inorganic intermediate layer 27. Inorganic porous support 24 is shown as including first end 28, second end 30, and plurality of inner channels 32 that extend through inorganic porous support 24 from first end 28 to second end 30. Inner channels 32 have surfaces 34 defined by porous walls 36, and porous inorganic intermediate layer 27 coats surfaces 34 of inner channels 32. Polymeric amine-containing membrane 26 coats porous inorganic intermediate layer 27's surface 38. In the embodiment illustrated in FIG. 3A, no polymeric protection layer is employed. In the embodiment illustrated in FIG. 3B, hybrid membrane structure 22 is shown as further including polymeric protection layer 42 coated on polymeric amine-containing membrane 26's surface 44.

The hybrid membrane structures of the present invention can be prepared by a variety of procedures, such as, for example, by the methods discussed below.

The present invention also relates to a method for making a hybrid membrane structure. The method includes:

providing an inorganic porous support that includes a first end, a second end, and a plurality of inner channels having surfaces defined by porous walls and extending through the support from the first end to the second end;

optionally applying one or more porous inorganic intermediate layers to the inner channel surfaces of the inorganic porous support; and applying a polymeric amine-containing membrane; wherein, when the one or more porous inorganic intermediate layers have not been applied to the inorganic porous support's inner channel surfaces, the inner channel surfaces of the inorganic porous support comprise a median pore size of 500 nanometers or less and the polymeric amine-containing membrane is applied to the inner channel surfaces of the inorganic porous support; and wherein, when the one or more porous inorganic intermediate layers have been applied to the inorganic porous support's inner channel surfaces, the polymeric amine-containing membrane is applied to the surface of the one or more porous intermediate layers.

Suitable inorganic porous supports that can be used in the practice of the method of the present invention include those discussed hereinabove.

For example, in certain embodiments, the porous walls which define the inner channels' surfaces have a median pore size of 500 nanometers or less, such as in cases where the porous walls which define the inner channels' surfaces have a median pore size of from 5 nanometers to 500 nanometers, from 5 nanometers to 400 nanometers, from 5 nanometers to 300 nanometers, from 5 nanometers to 400 nanometers, from 5 nanometers to 300 nanometers, from 5 nanometers to 400 nanometers, from 5 nanometers to 200 nanometers, from 5 nanometers to 100 nanometers, from 5 nanometers to 50 nanometers, etc.

The inorganic porous support can be provided in a variety of different ways. For example, it can be obtained commercially. Alternatively, it can be prepared by methods that are well known to those skilled in the art.

Illustratively, suitable inorganic porous supports can be prepared in accordance with the methods described in co-pending U.S. Patent Application No. 60/874,070, filed Dec. 11, 2006, which is hereby incorporated by reference; in U.S. Pat. No. 3,885,977 to Lachman et al., which is hereby incorporated by reference; and in U.S. Pat. No. 3,790,654 to Bagley et al., which is hereby incorporated by reference.

For example, the inorganic porous support can be made by combining 60 wt % to 70 wt % of alpha-alumina (having a particle size in the range of 5 microns to 30 microns), 30 wt % of an organic pore former (having a particle size in the range of 7 microns to 45 microns), 10 wt % of a sintering aid, and other batch components (e.g., crosslinker, etc.). The combined ingredients are mixed and allowed to soak for a period of time (e.g., 8 to 16 hours). The mixture is then shaped into a green body by extrusion. The resulting green body is sintered (e.g., at a temperature of 1500° C. or greater for a suitable period of time, such as for 8 to 16 hours) to form an inorganic porous support.

As noted above, the method of the present invention can optionally include applying one or more porous inorganic intermediate layers to the inner channel surfaces of the inorganic porous support. Situations in which one might wish to use the optional porous inorganic intermediate layer(s) and suitable materials from which the porous inorganic intermediate layer(s) can be made include those that are discussed hereinabove.

In those situations in which the method of the present invention includes applying one or more porous inorganic intermediate layers to the inner channel surfaces of the inorganic porous support, the one or more porous inorganic intermediate layers can be applied to the inner channel surfaces using any suitable method. Illustratively, the porous inorganic intermediate layers can be applied by coating (e.g., flow coating in a suitable liquid) ceramic or other inorganic particles of appropriate size (e.g., on the order of a few to a few tens of nanometers) onto the inner channel surfaces of the inorganic porous support. The inorganic porous support coated with the ceramic or other inorganic particles is then dried and fired to sinter the ceramic or other inorganic particles, thus forming a porous inorganic intermediate layer. Additional porous inorganic intermediate layers can be applied to the coated inorganic porous support by repeating the above process (e.g., with different inorganic particles), typically with drying and firing after each layer's application.

The drying and firing schedules can be adjusted based on the materials used in the inorganic porous support and in the porous inorganic intermediate layer(s). For example, an alpha-alumina intermediate layer applied to an alpha-alumina porous support can be dried in a humidity and oxygen controlled environment while maintaining a suitable temperature (e.g., 120° C.) for a suitable period of time (e.g., 5 hours); and, once dried, the alpha-alumina intermediate layer can be fired under conditions effective to remove organic components and to sinter the intermediate layer's alpha-alumina particles, such as, for example, at a temperature of from 900° C. to 1200° C. under a controlled gas environment.

Suitable methods for coating ceramic or other inorganic particles onto the inner channel surfaces of inorganic porous support and for forming them into porous inorganic intermediate layers are described, for example, in U.S. patent application Ser. No. 11/729,732, filed Mar. 29, 2007, which is hereby incorporated by reference; in U.S. patent application Ser. No. 11/880,066, filed Jul. 19, 2007, which is hereby incorporated by reference; and in U.S. patent application Ser. No. 11/880,073, filed Jul. 19, 2007, which is hereby incorporated by reference.

Irrespective of whether or not the method of the present invention includes the optional step of applying one or more porous inorganic intermediate layers to the inner channel surfaces of the inorganic porous support, the method also involves the application of a polymeric amine-containing membrane. In those cases where one or more porous inorganic intermediate layers have not been applied to the inorganic porous support's inner channel surfaces, the polymeric amine-containing membrane is applied to the inner channel surfaces of the inorganic porous support. In those cases where the one or more porous inorganic intermediate layers have been applied to the inorganic porous support's inner channel surfaces, the polymeric amine-containing membrane is applied to the surface of the one or more porous intermediate layers.

It will be appreciated that the polymeric amine-containing membrane need not be applied to all of the channels. For example, the polymeric amine-containing membrane can be applied to all of the inner channel surfaces of the inorganic porous support; or the polymeric amine-containing membrane be applied to some of the inner channel surfaces of the inorganic porous support; and the phrase "the polymeric amine-containing membrane is applied to the inner channel surfaces of the inorganic porous support" is meant to encompass both situations. Likewise, in those cases where the porous intermediate layer(s) is employed, the polymeric amine-containing membrane can be applied to the surface of the one or more porous intermediate layers in every channel; or the polymeric amine-containing membrane can be applied to the surface of the one or more porous intermediate layers in some of the channels; and the phrase "the polymeric amine-containing membrane is applied to the surface of the one or more porous intermediate layers" is meant to encompass both situations. Illustratively, depending on the expected conditions of use and the configuration of the channels in the inorganic porous support, it may be desirable to plug certain channels in the inorganic porous support, and the polymeric amine-containing membrane need not be applied to these channels; or it may be desirable not to plug certain channels in the inorganic porous support and not have a polymeric amine-containing membrane in these channels; or both.

Application of the polymeric amine-containing membrane (i.e., to the inner channel surfaces of the inorganic porous support or to the surface of the one or more porous intermediate layers) can be carried out by any suitable process, for example, by applying a polyamine and crosslinking the polyamine with a suitable crosslinking agent, such as an epoxy crosslinker.

Figure 4:
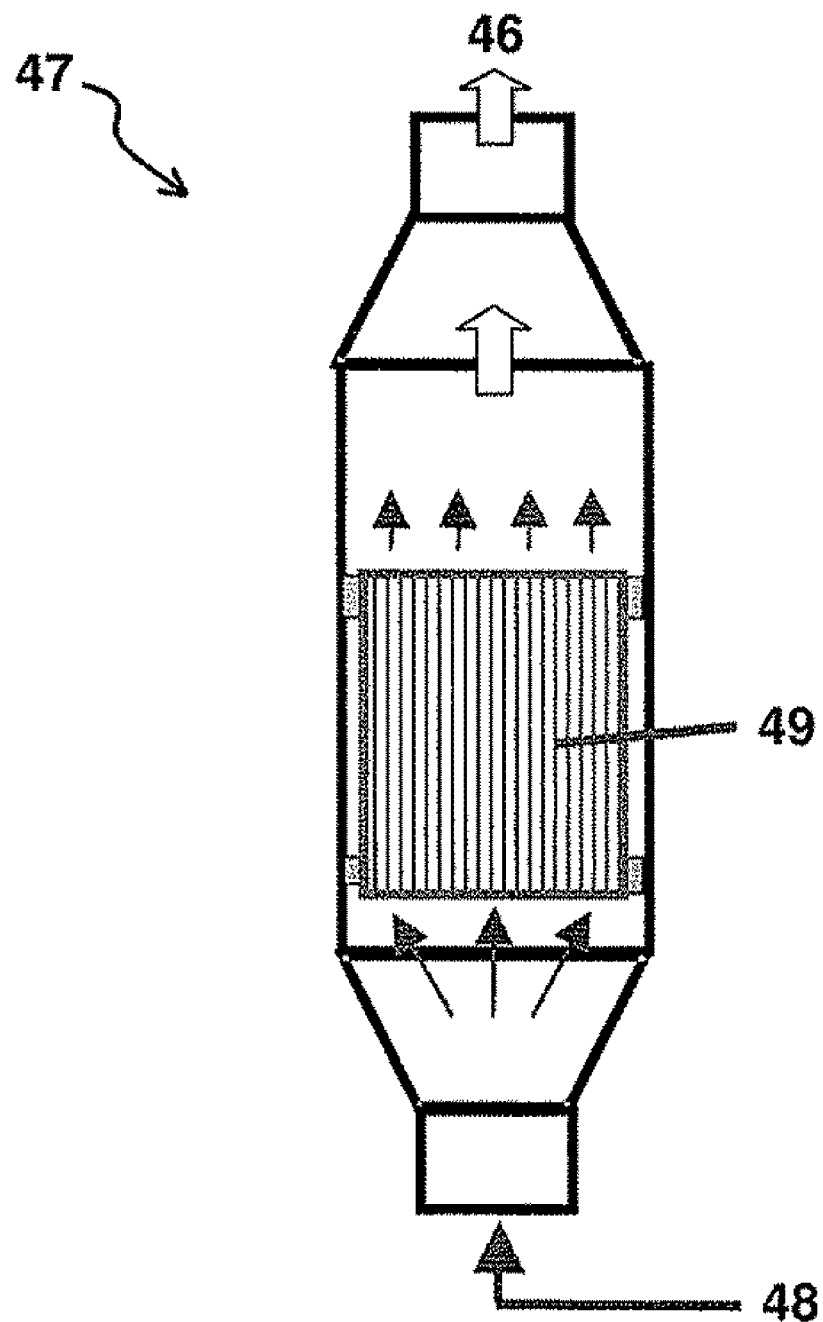
FIG. 4 is a schematic illustration of a vacuumed flow coating apparatus and process that can be used to coat a polyamine on surfaces in a ceramic monolith's channels during the preparation of a hybrid membrane structure according to the present invention.

Illustratively, the polyamine can be coated onto the inner channel surfaces of the inorganic porous support or onto the surface of the one or more porous intermediate layers by a dip coating procedure, such as by a procedure that involves dip-coating under vacuum or pseudo-vacuum, for example, as described in Example 1 of the present application; or by a flow-coating procedure, for example, as described in U.S. patent application Ser. No. 11/729,732, filed Mar. 29, 2007, which is hereby incorporated by reference. A suitable flow-coating procedure is shown schematically in FIG. 4 (details of which are described in U.S. patent application Ser. No. 11/729,732, filed Mar. 29, 2007, which is hereby incorporated by reference). Referring to FIG. 4, vacuum 46 is applied at the top of flow-coating apparatus 47, and the vacuum draws polyamine solution 48 through ceramic monolith 49. Briefly, vacuum can be applied until a suitable pressure (e.g., 150 mmHg) is achieved; the polyamine solution can then be put under the coating equipment and a valve can be turned so as to permit the polyamine solution to enter the coating equipment. Vacuum can be maintained until the polyamine solution flows from the top end of the ceramic monolith and for 10 seconds thereafter. After the 10-second period, the vacuum can be released, and the polyamine solution can be permitted to flow back into the reservoir. The coated ceramic monolith can then removed from the coating equipment, and the excess solution can be removed, for example, by rotating the coated ceramic monolith in a spinning device (e.g., at about 500 rpm for 45 seconds).

Suitable polyamines that can be used in the practice of the method of the present invention include those discussed hereinabove. Suitable thicknesses and other suitable characteristics of the polymeric amine-containing membrane are also discussed hereinabove and shall not be repeated here.

In certain embodiments, the polyamine includes a polyallylamine. In certain embodiments, the polyamine includes a polyallylamine, and the step of applying the polymeric amine-containing membrane further includes crosslinking the polyamine with an epoxy crosslinker. In certain embodiments, the polyamine includes a polyethylenimine. In certain embodiments, the polyamine includes a polyethylenimine, and the step of applying the polymeric amine-containing membrane further includes crosslinking the polyamine with an epoxy crosslinker. In certain embodiments, the polyamine includes a mixture of a polyallylamine and a poly(vinyl alcohol-co-vinylamine). In certain embodiments, the polyamine includes a mixture of a polyallylamine and a poly(vinyl alcohol-co-vinylamine), and the step of applying the polymeric amine-containing membrane further includes crosslinking the polyamine with an epoxy crosslinker.

The method of the present invention can further include applying a polymeric protection layer to the polymeric amine-containing membrane's surface. In those cases where a polymeric protection layer is to be employed, application of the polymeric protection layer can be carried out by applying a hydrophilic polymer or a mixture of a hydrophilic polymer and a polyamine and crosslinking the hydrophilic polymer or the hydrophilic polymer/polyamine mixture, for example, with an epoxy crosslinker.

Illustratively, the hydrophilic polymer or the hydrophilic polymer/polyamine mixture can be coated onto the polymeric amine-containing membrane's surface by a dip coating procedure, such as by a procedure that involves dip-coating under vacuum or pseudo-vacuum, for example, as described in Example 1 of the present application; or by a flow-coating procedure, for example, as described in U.S. patent application Ser. No. 11/729,732, filed Mar. 29, 2007, which is hereby incorporated by reference.

Suitable hydrophilic polymers and suitable polyamines that can be used in the application of the polymeric protection layer include those discussed hereinabove. Suitable thicknesses and other suitable characteristics of the polymeric protection layer are also discussed hereinabove and shall not be repeated here.

In certain embodiments, the hydrophilic polymer comprises a poly(vinyl alcohol-co-vinylamine), and no additional polyamine is used in the polymeric protection layer. In certain embodiments, the hydrophilic polymer comprises a poly(vinyl alcohol-co-vinylamine), no additional polyamine is used in the polymeric protection layer, and the step of applying a polymeric protection layer further includes crosslinking the poly(vinyl alcohol-co-vinylamine) with a suitable crosslinker, such as with an epoxy crosslinker. In certain embodiments, a mixture of a hydrophilic polymer and a polyamine is used, the hydrophilic polymer comprises a poly(vinyl alcohol-co-vinylamine), and the polyamine comprises a polyallylamine. In certain embodiments, a mixture of a hydrophilic polymer and a polyamine is used, the hydrophilic polymer comprises a poly(vinyl alcohol-co-vinylamine), the polyamine comprises a polyallylamine, and the step of applying a polymeric protection layer further includes crosslinking the polyallylamine and the poly(vinyl alcohol-co-vinylamine) with a suitable crosslinker, such as with an epoxy crosslinker.

Although the present application has focused on the use of epoxy crosslinkers, other crosslinkers can be employed either alone or in combination with epoxy crosslinkers. Examples of other suitable crosslinkers include thermo-crosslinking agents (e.g., those activated by the application of heat); photocrosslinking agents (e.g., those activated by the application of radiation, such as UV radiation or other forms of electromagnetic radiation); crosslinking agents that are activated either by heat or by radiation or by both; crosslinkers that proceed by radical processes; CARBODILITE™ V-02; and 1,2,3,4-butanetetracarboxylic acid.

In addition, poly vinyl alcohol-containing polymers, such as poly(vinyl alcohol-co-vinylamine), can be crosslinked through thermal treatment (thermal crosslinking), with or without the addition of a crosslinking agent. An example heat treatment is heating at a temperature of 150° C. or above for several minutes.

As yet an additional alternative, non-crosslinked polymeric amine-containing membranes and/or non-crosslinked polymeric protection layers can be employed.

Figure 5:
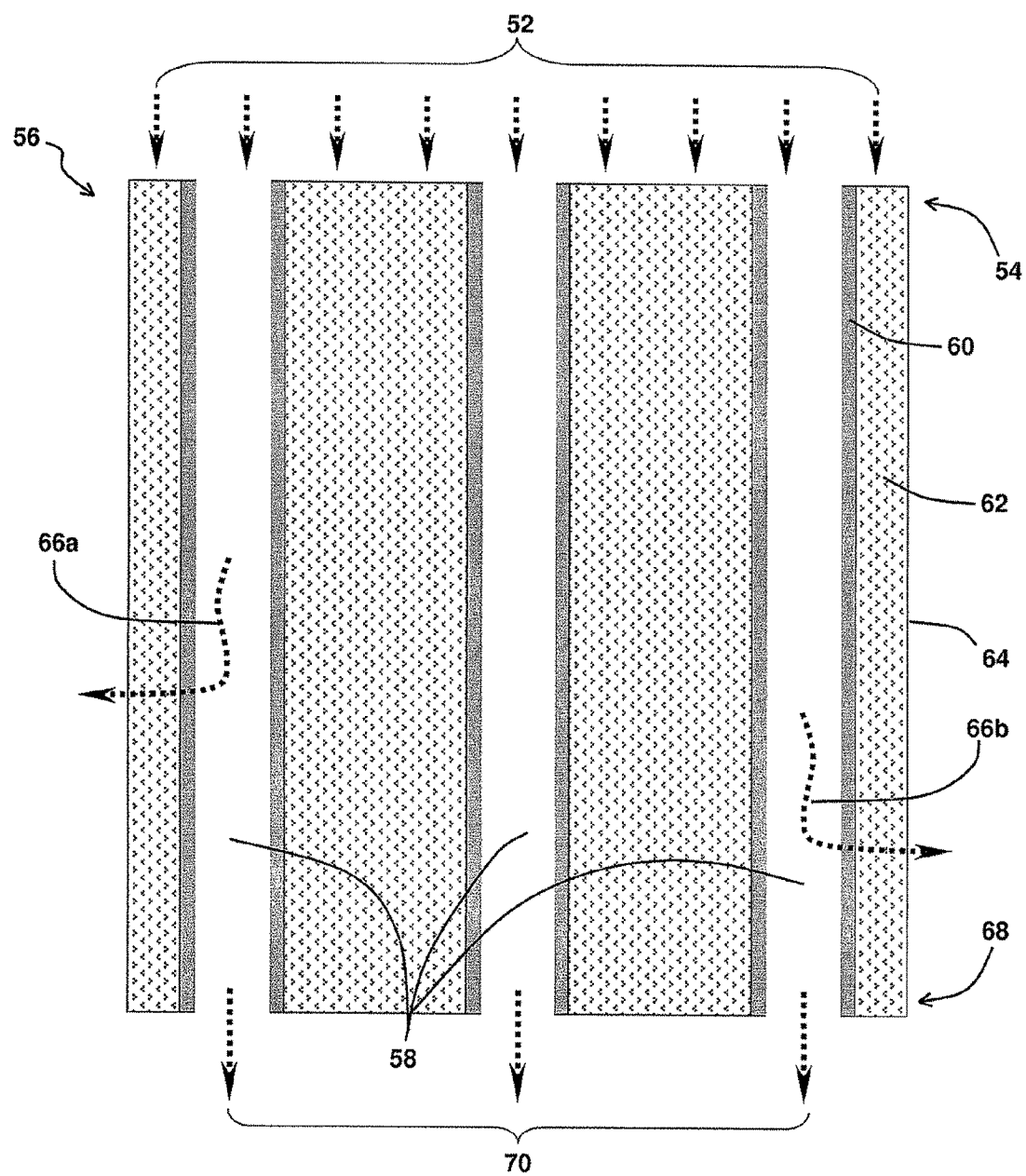
FIG. 5 is a schematic representation of a hybrid membrane structure according to the present invention showing its use in a gas separation application.

Hybrid membrane structures of the present invention and hybrid membrane structures made in accordance with the methods of the present invention can be used in a variety of applications, such as in methods for reducing $CO_2$ and/or $H_2S$ content in a gas stream. For example, $CO_2$ and/or $H_2S$ content in a gas stream can be reduced by a method that includes: introducing a feed gas comprising $CO_2$ and/or $H_2S$ into a first end of a hybrid membrane structure of the present invention; and collecting a retentate gas stream lower in $CO_2$ and/or $H_2S$ content than the feed gas from a second end of the hybrid membrane structure. The process is illustrated in FIG. 5. Feed gas 52 is introduced into first end 54 of hybrid membrane structure 56 and passes into channels 58. Some of the carbon dioxide molecules in feed gas 52 permeate through polymeric amine-containing membrane 60 that is disposed on channels 58, into inorganic porous support 62, and, after passing through the pores of inorganic porous support 62, emanate from hybrid membrane structure 56's outer surface 64. The path of such carbon dioxide molecules is represented by arrows 66a and 66b. The remainder of feed gas 52 remains in channels 58 and is permitted to exit second end 68 of hybrid membrane structure 56 as retentate gas stream 70. Retentate gas stream 70 that is collected from second end 68 of hybrid membrane structure 56 is lower in carbon dioxide content than feed gas 52. Depending on the application and the nature of the feed gas involved, the collected gas can be stored, used as a feed gas in a further process, or discharged to the atmosphere. Carbon dioxide which emanates from hybrid membrane structure 56's outer surface 64 can be collected and stored, used in some other process, or discharged to the atmosphere. The feed gas can further include (i.e., in addition to the carbon dioxide) one or more other gases, such as hydrogen, water vapor, carbon monoxide, nitrogen, hydrocarbons, and combinations thereof. It will be appreciated that the process discussed above in relation to FIG. 5 is for illustration purposes only and that the process can be used to separate $H_2S$, for example, from a feed gas that includes $H_2S$ and one or more other gases, such as hydrogen, water vapor, carbon monoxide, nitrogen, hydrocarbons, and combinations thereof.

The present invention is further illustrated by the following non-limiting examples.

EXAMPLES

Example 1

Materials Used in the Preparation of Hybrid Membrane Structures

Three ceramic monoliths based on $TiO_2$, $SiO_2$, and alpha-alumina were coated with polymeric membrane.

The $TiO_2$ and $SiO_2$ based ceramic monoliths had a pore size of 50 nm and 5 nm, respectively, and an intermediate layer was not coated on the $TiO_2$ and $SiO_2$ based ceramic monoliths.

Figure 6:
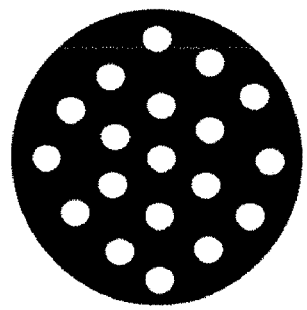
FIG. 6 is a cross-sectional view of an alpha-alumina based ceramic monolith membrane support used in certain embodiments of the hybrid membrane structures according to the present invention.

FIG. 6 is an illustration of the cross-section of the alpha-alumina based ceramic monolith membrane support used in these experiments. It was produced by extrusion and had a mean pore size of about 3.5 microns, a porosity of 45%, an outer diameter of 9.7 mm, and a length of 131 mm. The alpha-alumina based ceramic monolith membrane support comprised 19 rounded channels (mean diameter about 0.75 mm) being uniformly distributed over the cross-section. An alpha-alumina modification coating layer with mean pore size about 100 nm was first deposited on the support at about 10 microns thickness, and a gamma-alumina layer was further deposited at about 1-2 microns thickness with a mean pore size about 5 nm.

The following polymeric materials were used to prepare the polymeric membranes: Polyethylenimine ("PEIm"): Mn ~10000, Aldrich, prepared to 20% aqueous solution in house. Polyallylamine ("PAAm"): Mn ~15000, Beckmann Chemical Corp, Inc., 15% aqueous solution. Poly(vinyl alcohol-co-vinylamine) ("PVAAm"): Mn 30000-50000, Erkol L12, containing 12% mol vinylamine, product of Celanese Corporation, prepared to 8% aqueous solution in house. Epoxy, glycerol-propoxylate triglycidyl ether ("GPTE"): Mn 620-680, Aldrich, prepared to 3% alcohol (isopropanol also from Aldrich) solution in house.

Figure 7:
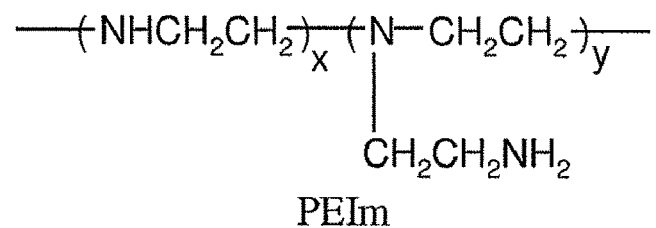
FIG. 7 shows chemical structures of various polymeric materials that can be used in the preparation of various hybrid membrane structures according to the present invention.
Figure 7:
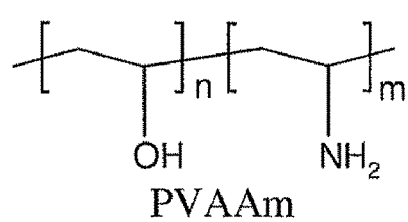
Figure 7:
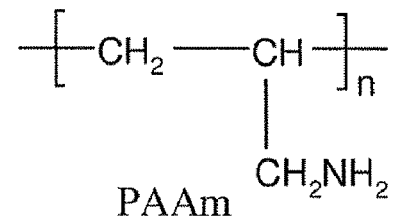
Figure 7:
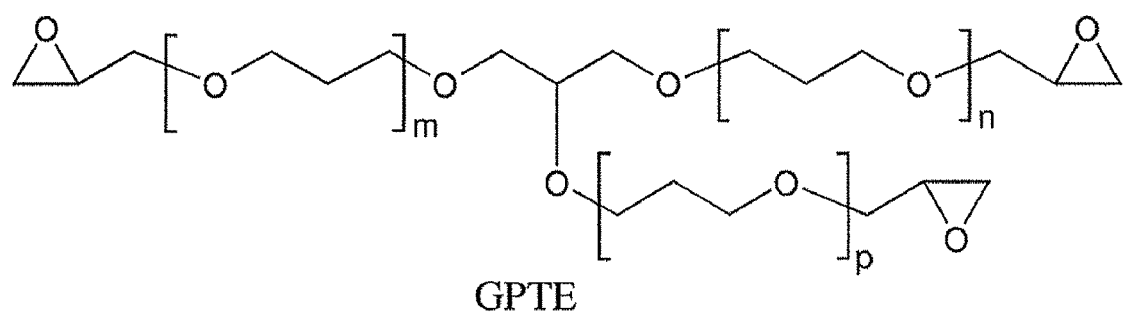

The chemical structures of PEIm, PAAm, PVAAm, and GPTE are set forth in FIG. 7.

Example 2

Figure 8:
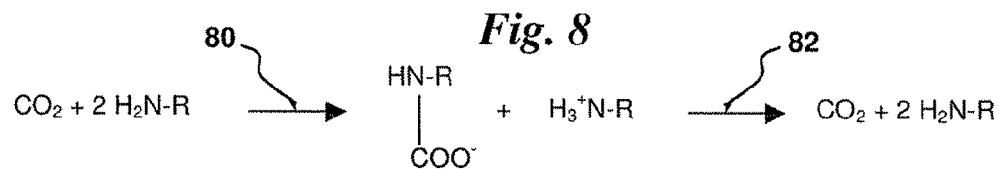
FIG. 8 shows a hypothetical mechanism for $CO_2$ transport through the polymeric amine-containing membrane of a hybrid membrane structure according to the present invention.

Preparation of Hybrid Membrane Structures Using Ceramic Monoliths Based on Either $TiO_2$ or $SiO_2$ PEIm or PAAm was coated onto the substrate as the first layer (the bottom layer) of the polymer membrane, in part because it was thought that PEIm or PAAm contain a large amount of amino-groups which would provide a matrix for $CO_2$ transport, for example, through formation of carbamate intermediates, as shown in the scheme set forth in FIG. 8. In FIG. 8, arrow 80 refers to an absorption process on the feed side, and arrow 82 refers to a desorption process on the permeate side.

PVAAm contains 12% mol vinylamine and itself possesses the separation property for $CO_2$. It is also believed to be a good membrane formation material even without crosslinking. In this work, the PVAAm, together with the PAAm, was coated as the second layer (the top layer). It is believed that this combination gives the second (top) layer not only good gas separation capacity but also provides protection to the first (bottom) layer (e.g., to the pure PEIm or PAAm layer). Moreover, since PVAAm contains 12% mol vinylamine, it is believed to have excellent compatibility with the PAAm. It should be noted that the PVAAm/PAAm combination can also be used to form the first layer of the membrane, in which case a second (top) layer need not be used.

The epoxy, GPTE, was used as the crosslinker. In these experiments, a post crosslinking process was applied after the first or second membrane was coated because of easy reaction between the epoxy and amino-groups. It should be noted, however that crosslinking can be effected by adding a suitable crosslinker to the membrane-forming polymer before the membrane-forming polymer (or combination of membrane-forming polymers) is coated.

The focus of this Example 2 is on the process of coating a polymer membrane onto ceramic monolith substrates, particularly onto $TiO_2$-based and $SiO_2$-based ceramic monolith substrates. Two polymer membrane systems, a PEIm/PVAAm-PAAm membrane system and a PAAm/PVAAm- PAAm membrane system, were successfully coated onto TiO$_2$-based and SiO$_2$-based ceramic monolith substrates through a 4-step coating process. The materials used in each of the steps are set forth in the following Table 1.

TABLE 1

| | Polymer membrane system | |
|---|---|---|
| | PEIm/PVAAm-PAAm | PAAm/PVAAm-PAAm |
| 1st layer membrane | 25% PEIm aqueous solution | 15% PAAm aqueous solution |
| Crosslinker for 1st layer membrane | 3% GPTE alcohol solution | 3% GPTE alcohol solution |
| 2nd layer membrane | Aqueous solution of 60% wt of 8% PVAAm and 40% wt of 15% PAAm | Aqueous solution of 60% wt of 8% PVAAm and 40% wt of 15%% PAAm |
| Crosslinker for 2nd layer membrane | 3% GPTE alcohol solution | 3% GPTE alcohol solution |

Briefly, as a first step, an amino-functionalized polymer, PEIm or PAAm (which functions as the first (bottom) layer of the polymeric membrane system) was coated onto the substrate. Second, GPTE was applied to crosslink the amino-functionalized polymer to form a crosslinked membrane of the first layer. The third step was to coat the second layer of polymeric membrane system, a combination of PVAAm and PAAm, onto the first layer. The fourth and final step in this process, was to apply GPTE crosslinker onto the second (top) layer to crosslink the second (top) layer.

More particularly, the mass of a dried ceramic monolith support was measured. The monolith was then wrapped with TEFLON™ tape and the mass was measured again. On one end of the ceramic monolith a pseudo vacuum system (syringe) was connected. Then, the other end of the ceramic monolith was soaked in 25% PEIm (or 15% PAAm) aqueous solution while withdrawing the syringe. After the solution came out from the end which was connected to the syringe for 10 seconds, the solution was pushed out, and the ceramic monolith was spun, end-over-end, at about 50 rpm for 45 seconds to remove the extra solution from the channels of the ceramic monolith. The coated ceramic monolith was dried for 2 hours with N$_2$ gas at a flow rate of about 10 ml/min. The coated ceramic monolith was then placed into a dryer, (which was preheated to 80° C.) for 4 hours. After cooling to room temperature, the mass was measured to obtain the weight gain. The above procedure was repeated for the second, third, and fourth steps. In the second step, the solution was changed to the epoxy-alcohol solution to apply crosslinker to the first layer. In the third step, the solution was changed to the mixture of PVAAm and PAAm to coat the second layer. In the fourth step, the solution was changed again to the epoxy-alcohol solution to apply crosslinker to the second layer. Because epoxy reacts with the amino-group easily, curing (in the second and fourth steps) was carried out at room temperature for 4 hours and then at 50° C. for 2 hours. After curing, N$_2$ gas at a flow rate of around 60 ml/min was applied to dry the membrane coated substrate for 15 minutes.

FIGS. 9A-9C, 10A-10C, 11A-11C, and 12A-12C are SEM images of bare and polymer membrane coated ceramic monoliths based on either TiO$_2$ or SiO$_2$. The SEM images clearly show that polymeric membrane was successfully coated onto the TiO$_2$-based and SiO$_2$-based substrates.

Figure 9A:
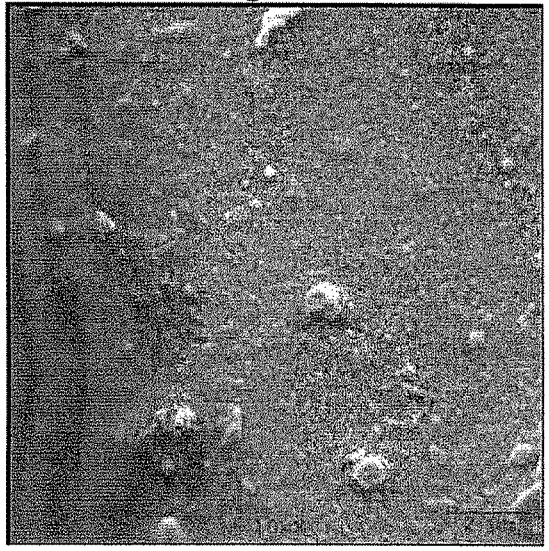
FIGS. 9A, 10A, 11A, and 12A are SEM images of bare inorganic porous supports useful in making hybrid membrane structures according to the present invention.
Figure 9B:
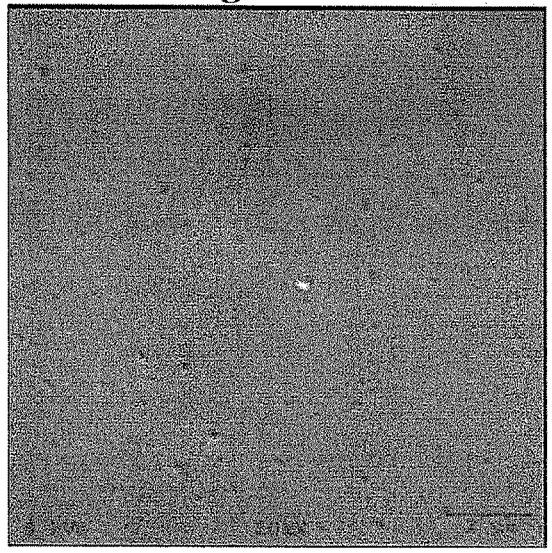
FIGS. 9B-9C, 10B-10C, 11B-11C, and 12B-12C are SEM images of hybrid membrane structures according to the present invention.
Figure 9C:
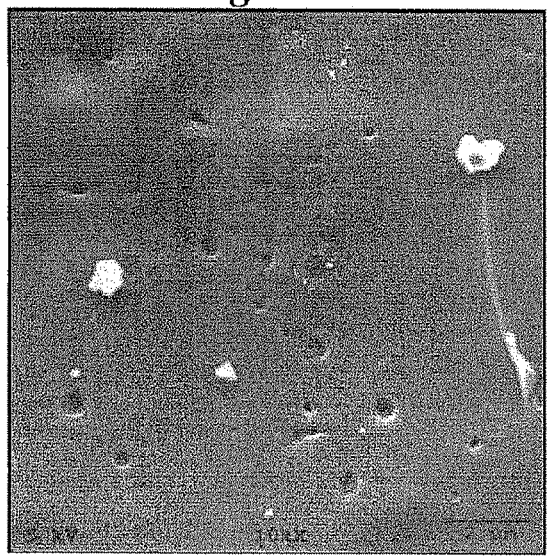

FIG. 9A is an SEM image showing the surface of a bare TiO$_2$-based substrate. FIGS. 9B and 9C are SEM images showing the surface of TiO$_2$-based substrate coated with a PEIm/PVAAm-PAAm membrane system (FIG. 9B) and with a PAAm/PVAAm-PAAm membrane system (FIG. 9C).

Figure 10A:
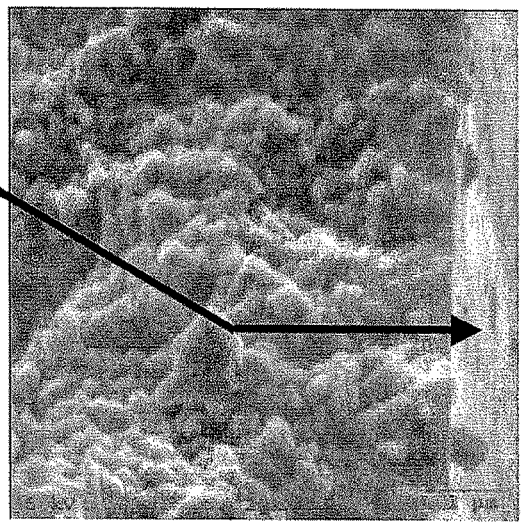
Figure 10B:
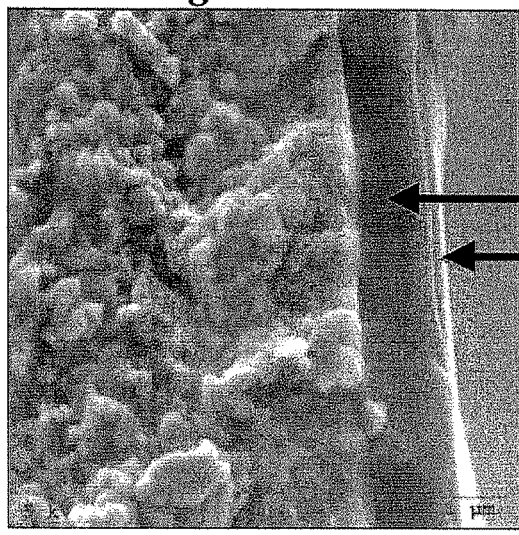
Figure 10C:
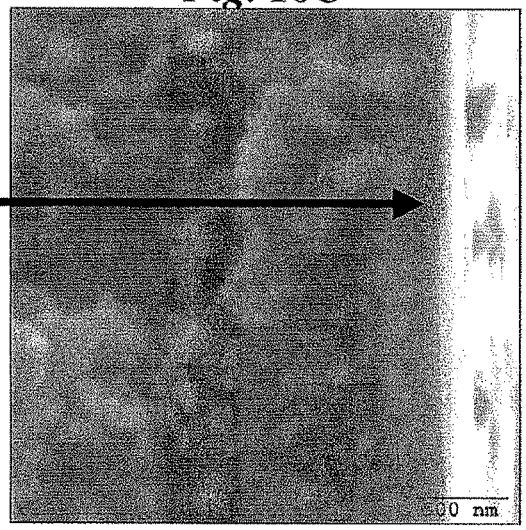

FIG. 10A is an SEM image of a fractured intersection of a bare TiO$_2$-based substrate. FIGS. 10B and 10C are SEM images of a fractured intersection of a TiO$_2$-based substrate coated with a PEIm/PVAAm-PAAm membrane system (FIG. 10B) and with a PAAm/PVAAm-PAAm membrane system (FIG. 10C). In FIG. 10A, bare surface 86 is identified. In FIG. 10B, first layer 88 and second layer 90 are identified. In FIG. 10C, polymer membrane 92 is identified.

Figure 11A:
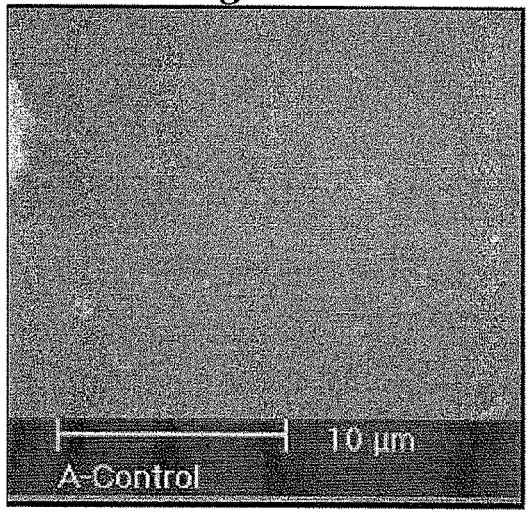
Figure 11B:
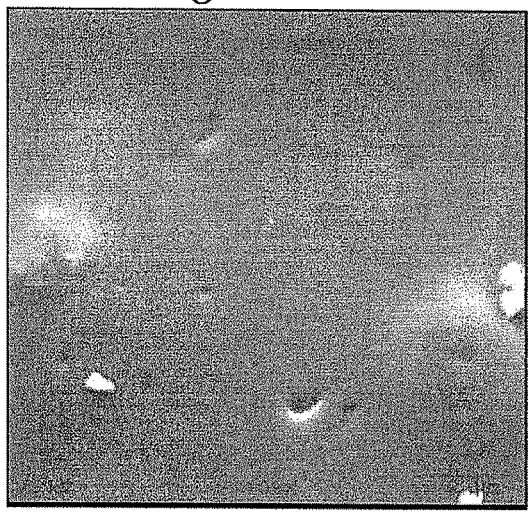
Figure 11C:
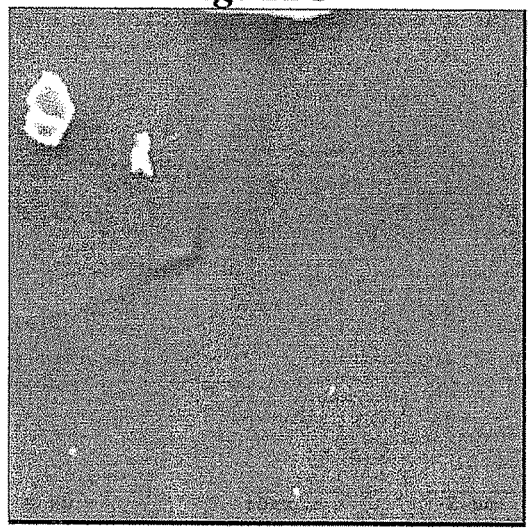

FIG. 11A is an SEM image showing the surface of a bare SiO$_2$-based substrate. FIGS. 11B and 11C are SEM images showing the surface of SiO$_2$-based substrate coated with a PEIm/PVAAm-PAAm membrane system (FIG. 11B) and with a PAAm/PVAAm-PAAm membrane system (FIG. 11C).

Figure 12A:
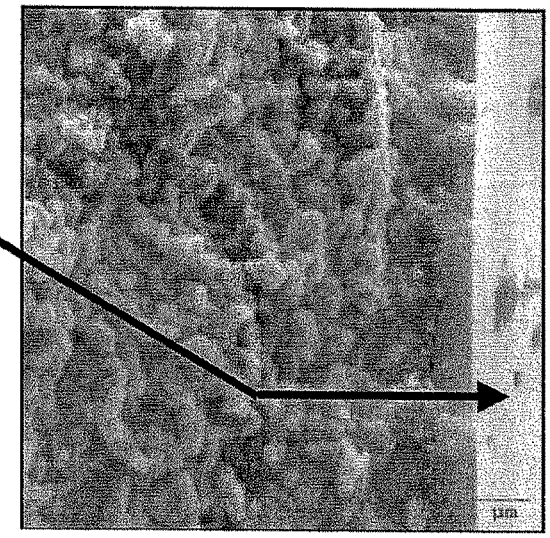
Figure 12B:
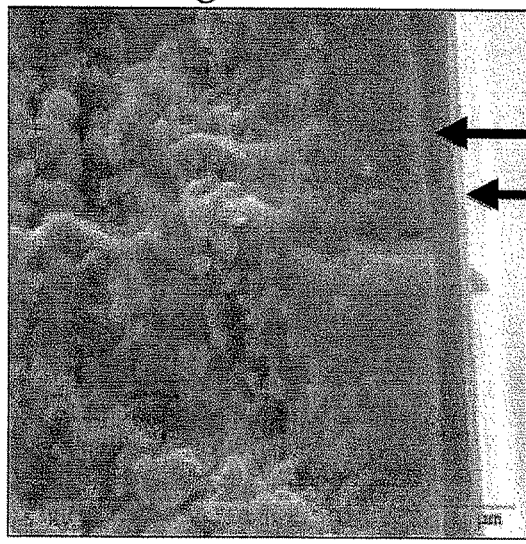
Figure 12C:
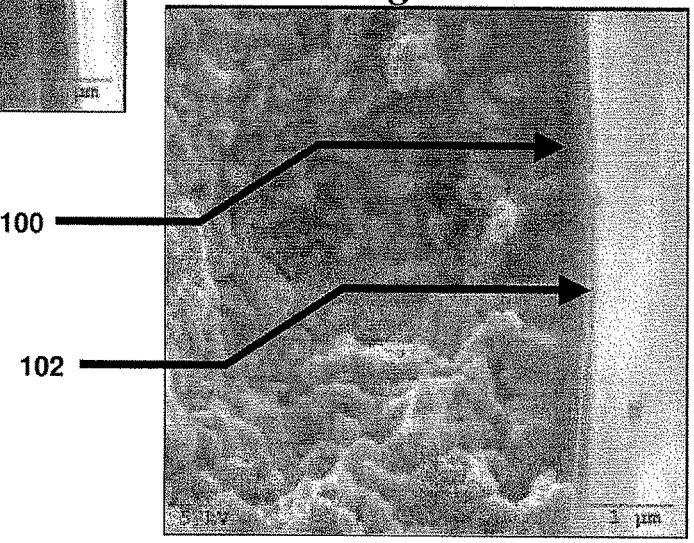

FIG. 12A is an SEM image of a fractured intersection of a bare SiO$_2$-based substrate. FIGS. 12B and 12C are SEM images of a fractured intersection of a SiO$_2$-based substrate coated with a PEIm/PVAAm-PAAm membrane system (FIG. 12B) and with a PAAm/PVAAm-PAAm membrane system (FIG. 12C). In FIG. 12A, bare surface 94 is identified. In FIG. 12B, first layer 96 and second layer 98 are identified. In FIG. 12C, first layer 100 and second layer 102 are identified.

Example 3

Permeability Testing

This Example 3 describes permeability tests of the hybrid membrane structure using the gamma-alumina coated alpha-alumina support. As described in Example 1, the gamma-alumina coated alpha-alumina support is an alpha-alumina based ceramic monolith having two modification coating layers: a 10 micron thick modification coating layer having a mean pore size of about 100 nm and a 1-2 micron thick gamma-alumina layer having a mean pore size of about 5 nm.

Two hybrid membrane structures were prepared using this gamma-alumina coated alpha-alumina support. The first used PAAm as the polymeric amine-containing membrane and did not include a polymeric protection layer. The PAAm was applied to the gamma-alumina intermediate layer using the procedure described in Example 2, and it was crosslinked using GPTE, also using the procedure described in Example 2. The second used PAAm as the polymeric amine-containing membrane and also included a PVAAm protection layer. The PAAm and PVAAm layers were applied sequentially to the gamma-alumina intermediate layer using the four-step procedure described in Example 2, crosslinking being effected using GPTE.

Permeability of the gamma-alumina coated alpha-alumina support sample, with and without polymeric membrane coating, was measured in a flow system. The support was placed inside a gas-tight stainless steel tube. Gas was introduced into the support's channels by a mass flow controller and was maintained at a certain pressure; the permeation side of the system (i.e., the exterior of the support) was maintained at atmospheric pressure; and the permeation flow rate was measured.

As a preliminary experiment, permeances of He, N$_2$, and CO$_2$ gas through the gamma-alumina coated alpha-alumina support (i.e., bare support without polymeric amine-containing membrane) under different pressure gradients were calculated.

Figure 13:
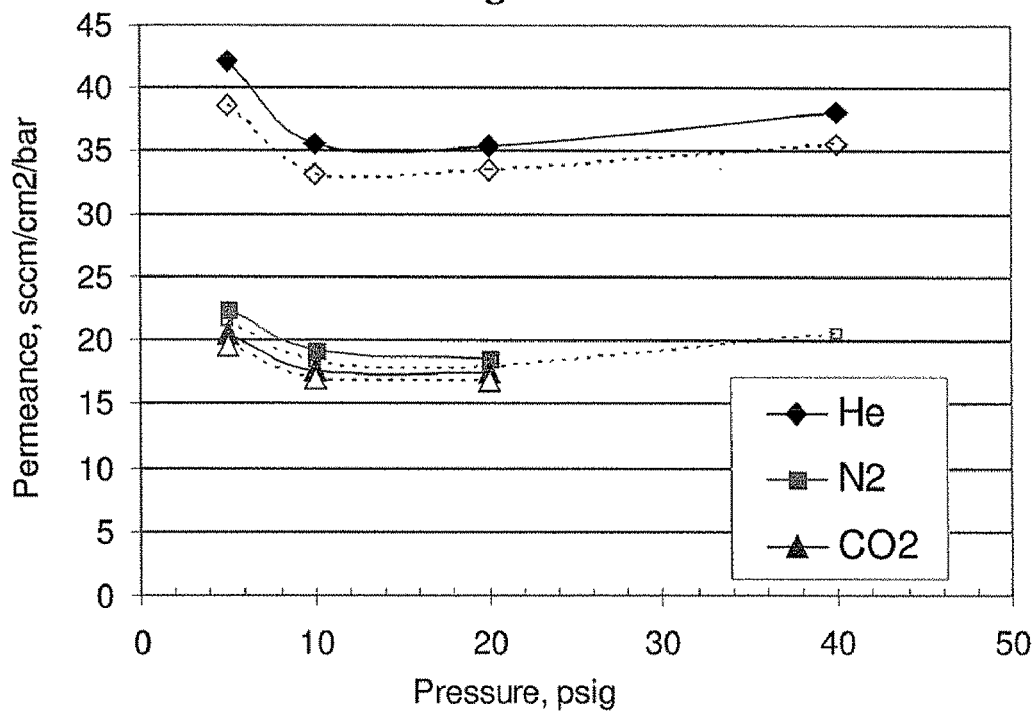
FIG. 13 is a graph of permeance as a function of feed gas pressure for various gasses through a gamma-alumina coated alpha-alumina monolith support useful in making hybrid membrane structures according to the present invention. Solid line shows data at 21° C., and dashed line shows data at 65° C.

Permeance was calculated based on the following equation:

$$\text{Permeance} = Q_P / ((SA_M) A (\Delta P))$$

where $Q_p$ is the permeation flow rate, in units of standard cubic centimeters per minute ("sccm"); $SA_M$ is the surface area being permeated (i.e., the total surface area of the channels) in units of square centimeters ($cm^2$); and $\Delta P$ is the pressure differential between the channel and the permeation side in units of bar ($10^6$ dyn/m$^2$). The results are presented in FIG. 13. FIG. 13 shows that the permeance of He is about two times of that of the $CO_2$, while the permeance of $N_2$ is slightly higher than that of the $CO_2$. Since the channel walls of the gamma-alumina coated alpha-alumina support have a pore size is about 5 nm, gas transport through the gamma-alumina layer could be significantly contributed to by Knudsen diffusion. It is expected that the He has a much faster transport rate than the $CO_2$ since the molecular weight of He is much less than that of the $CO_2$. FIG. 13 also shows that permeances of the three gases decrease slightly as the temperature is raised from 20° C. to 65° C., probably due to decreasing gas density.

Figure 14:
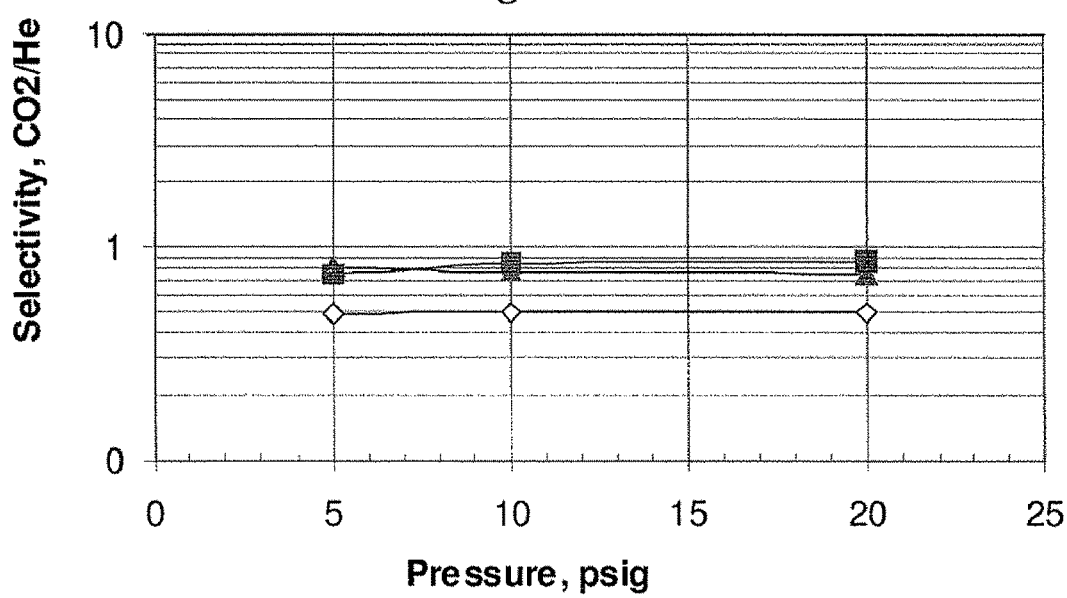
FIG. 14 is a graph of room temperature $CO_2$/He selectivity as a function of feed gas pressure for bare gamma-alumina coated alpha-alumina monolith support (open symbols); for a hybrid membrane structure according to the present invention coated with PAAm (solid triangles); and for a hybrid membrane structure according to the present invention coated with PAAm and further coated with a PVAAm protection layer (solid squares).

We then determined the selectivity of the membranes for $CO_2$. Selectivity was calculated as the ratio of $CO_2$ permeance to He permeance. The $CO_2$/He selectivities for the two polymeric membrane coated samples are shown in FIG. 14 (solid triangles, PAAm coating; solid squares, PAAm coating with PVAAm protection layer), along with the $CO_2$/He selectivity of the bare gamma-alumina coated alpha-alumina support (i.e., support without polymeric amine-containing membrane) (open symbols). FIG. 14 shows that the $CO_2$/He selectivity is 0.5 for the bare gamma-alumina coated alpha-alumina support. With the polymeric coatings, the $CO_2$/He selectivities increase to about 0.7 to 1.0. These data demonstrate that the polymeric membrane coatings enhances $CO_2$/He selectivity.

Figure 15:
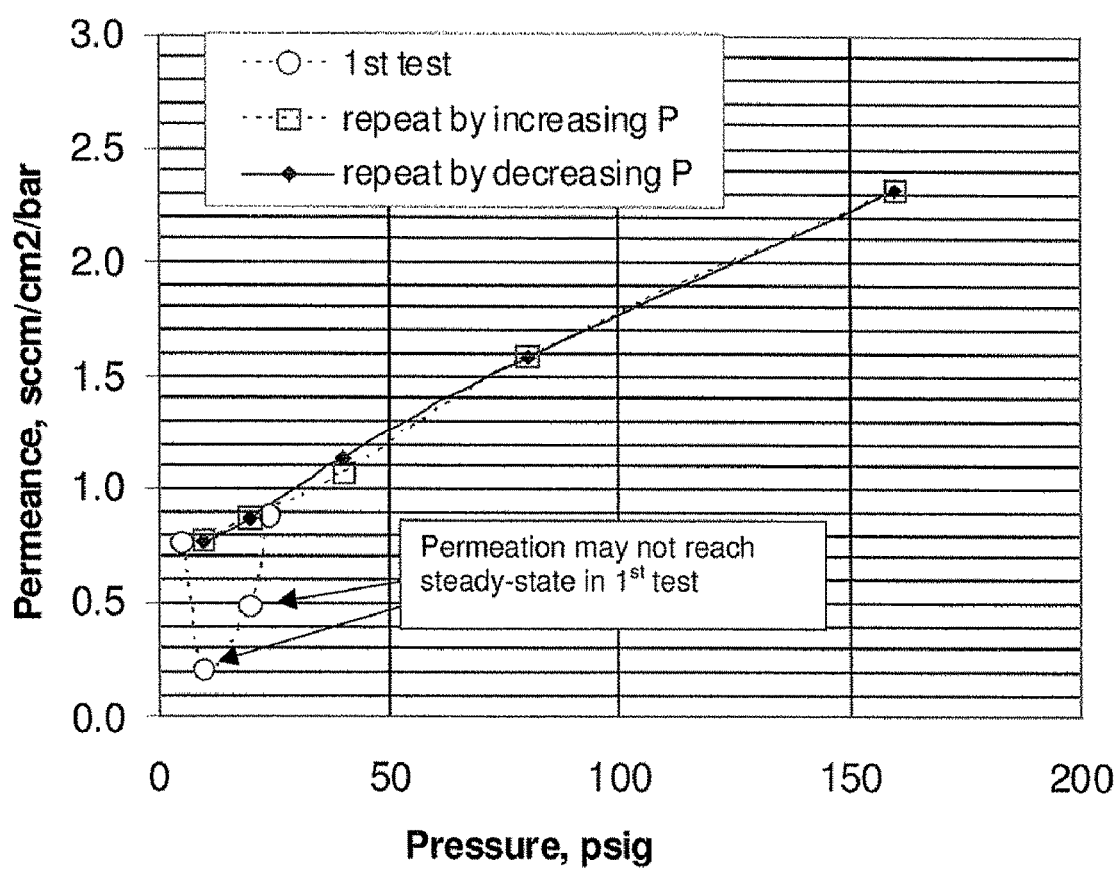
FIG. 15 is a graph of permeance as a function of feed gas pressure showing no significant change in $CO_2$ permeance during repeated tests through a gamma-alumina coated alpha-alumina monolith support useful in making hybrid membrane structures according to the present invention.

The hybrid membrane shows excellent stability, and there is no change in the $CO_2$ permeance during repeated tests, as shown in FIG. 15.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention, as defined in the claims which follow.

The invention claimed is:

1. A hybrid membrane structure comprising:
   an inorganic porous support comprising a first end, a second end, and a plurality of inner channels having surfaces defined by porous walls and extending through the support from the first end to the second end;
   optionally, one or more porous inorganic intermediate layers coating the inner channel surfaces of the inorganic porous support;
   a polymeric amine-containing membrane comprising a mobile non-polymeric amine and a crosslinked polyamine; and
   a polymeric protection layer coated on at least one surface of the polymeric amine-containing membrane and comprising a hydrophilic polymer and a polyamine;
   wherein, when the hybrid membrane structure does not comprise the one or more porous inorganic intermediate layers, the inner channel surfaces of the inorganic porous support comprise a median pore size of 500 nanometers or less and the polymeric amine-containing membrane coats the inner channel surfaces of the inorganic porous support; and wherein, when the hybrid membrane structure comprises the one or more porous inorganic intermediate layers, the polymeric amine-containing membrane coats the surface of the one or more porous intermediate layers.

2. A hybrid membrane structure according to claim 1, wherein the inorganic porous support is in the form of a honeycomb monolith.

3. A hybrid membrane structure according to claim 1, wherein the inorganic porous support is a ceramic monolith.

4. A hybrid membrane structure according to claim 1, wherein the hybrid membrane structure does not comprise the one or more porous inorganic intermediate layers, wherein the inner channel surfaces of the inorganic porous support comprise a median pore size of 500 nanometers or less, and wherein the polymeric amine-containing membrane coats the inner channel surfaces of the inorganic porous support.

5. A hybrid membrane structure according to claim 1, wherein the hybrid membrane structure comprises the one or more porous inorganic intermediate layers and wherein the polymeric amine-containing membrane coats the surface of the one or more porous intermediate layers.

6. A hybrid membrane structure according to claim 1, wherein the polymeric amine-containing membrane comprises a polyamine crosslinked with an epoxy crosslinker.

7. A hybrid membrane structure according to claim 1, wherein the polymeric amine-containing membrane comprises a crosslinked polyallylamine, a crosslinked polyethylenimine, or combinations thereof.

8. A hybrid membrane structure according to claim 1, wherein the polymeric amine-containing membrane comprises a polyallylamine, a polyethylenimine, or combinations thereof crosslinked with an epoxy crosslinker.

9. A hybrid membrane structure according to claim 1, wherein the polymeric amine-containing membrane comprises a crosslinked polyallylamine and a crosslinked poly(vinyl alcohol-co-vinylamine).

10. A hybrid membrane structure according to claim 1, wherein the polymeric amine-containing membrane comprises a polyallylamine and a polyvinyl alcohol-co-vinylamine) crosslinked with an epoxy crosslinker.

11. A hybrid membrane structure according to claim 1, wherein the polymeric protection layer is a membrane comprising a polyallylamine and a poly(vinyl alcohol-co-vinylamine).

12. A hybrid membrane structure according to claim 1, wherein the polymeric protection layer is a membrane comprising crosslinked polyallylamine and poly(vinyl alcohol-co-vinylamine).

13. A hybrid membrane structure according to claim 1, wherein the polymeric protection layer is a membrane comprising a polyallylamine and a poly(vinyl alcohol-co-vinylamine) crosslinked with an epoxy crosslinker.

14. A method for making a hybrid membrane structure, said method comprising:
   providing an inorganic porous support comprising a first end, a second end, and a plurality of inner channels having surfaces defined by porous walls and extending through the support from the first end to the second end;
   optionally applying one or more porous inorganic intermediate layers to the inner channel surfaces of the inorganic porous support;
   applying a polymeric amine-containing membrane comprising a mobile non-polymeric amine and a crosslinked polyamine; and
   applying a polymeric protection layer to at least one surface of the polymeric amine-containing membrane, wherein the polymeric protection layer comprises a hydrophilic polymer and a polyamine;

wherein, when the one or more porous inorganic intermediate layers have not been applied to the inorganic porous support's inner channel surfaces, the inner channel surfaces of the inorganic porous support comprise a median pore size of 500 nanometers or less and the polymeric amine-containing membrane is applied to the inner channel surfaces of the inorganic porous support; and wherein, when the one or more porous inorganic intermediate layers have been applied to the inorganic porous support's inner channel surfaces, the polymeric amine-containing membrane is applied to the surface of the one or more porous intermediate layers.

15. A method according to claim 14, wherein said crosslinked polyamine utilizes an epoxy crosslinker.

16. A method according to claim 15, wherein the crosslinked polyamine comprises a polyallylamine, a polyethylenimine, or combinations thereof.

* * * * *